(12) United States Patent
Parekh et al.

(10) Patent No.: US 10,796,333 B1
(45) Date of Patent: *Oct. 6, 2020

(54) AD EXCHANGE ON AD SERVER FOR LINEAR BROADCAST PLAYOUT SYSTEM

(71) Applicant: Jelli, Inc., San Mateo, CA (US)

(72) Inventors: Jateen P. Parekh, San Mateo, CA (US); Michael S. Dougherty, Burlingame, CA (US); Torsten Schulz, Palo Alto, CA (US); John Paul LeFlohic, San Mateo, CA (US); Sreeharsha Kamireddy, Danville, CA (US)

(73) Assignee: Jelli, Inc., San Mateo, CA (US)

( * ) Notice: Subject to any disclaimer, the term of this patent is extended or adjusted under 35 U.S.C. 154(b) by 474 days.

This patent is subject to a terminal disclaimer.

(21) Appl. No.: 15/130,841

(22) Filed: Apr. 15, 2016

Related U.S. Application Data

(60) Provisional application No. 62/149,448, filed on Apr. 17, 2015.

(51) Int. Cl.
*G06Q 30/02* (2012.01)
*H04L 29/06* (2006.01)
*G06Q 10/08* (2012.01)

(52) U.S. Cl.
CPC ....... *G06Q 30/0241* (2013.01); *G06Q 10/087* (2013.01); *H04L 65/4076* (2013.01)

(58) Field of Classification Search
USPC .............. 14/51, 66, 43; 705/14.66
See application file for complete search history.

(56) References Cited

U.S. PATENT DOCUMENTS

| | | | | |
|---|---|---|---|---|
| 2007/0162926 A1* | 7/2007 | Steelberg | ............ | H04L 63/0428 725/34 |
| 2009/0006145 A1* | 1/2009 | Duggal | ................. | G06Q 30/02 705/6 |
| 2009/0313120 A1* | 12/2009 | Ketchum | ............... | G06Q 30/02 705/14.51 |
| 2011/0015968 A1* | 1/2011 | Carlson | ................ | G06Q 20/102 705/310 |
| 2012/0166289 A1* | 6/2012 | Gadoury | ............ | H04N 21/6437 705/14.66 |
| 2014/0081741 A1* | 3/2014 | Katsur | ............... | G06Q 30/0247 705/14.43 |

* cited by examiner

*Primary Examiner* — Afaf Osman Bilal Ahmed
(74) *Attorney, Agent, or Firm* — Van Pelt, Yi & James LLP

(57) ABSTRACT

Inventory data representing for each of a plurality of broadcast stations a corresponding inventory of audio advertising spots available from that broadcast station to be filled by an advertising exchange system is stored. One or more sets of advertising campaign data, each representing a set of advertising objectives of an advertising campaign, is received via a demand side interface. The inventory data is received via a supply side interface. The inventory data is used to determine for each advertising campaign a corresponding set of advertising spots to be associated with that advertising campaign.

22 Claims, 12 Drawing Sheets

AD EXCHANGE ON AD SERVER FOR LINEAR BROADCAST PLAYOUT SYSTEM

CROSS REFERENCE TO OTHER APPLICATIONS

This application claims priority to U.S. Provisional Patent Application No. 62/149,448 entitled AD EXCHANGE ON AD SERVER FOR LINEAR BROADCAST PLAYOUT SYSTEM filed Apr. 17, 2015 which is incorporated herein by reference for all purposes.

BACKGROUND OF THE INVENTION

Broadcast networks such as those in radio and television offer advertising spots to finance operations. The matching of advertising spots to advertisements in a broadcast network differs from the matching in other media, such as online advertising, at least in part because of the nature of planning broadcast schedules in advance and the one-way one-to-many nature of a broadcast network. Determining advertising spots in broadcast networks is currently a complex and manual process that does not necessarily maximize benefit to either advertiser or broadcaster.

BRIEF DESCRIPTION OF THE DRAWINGS

Various embodiments of the invention are disclosed in the following detailed description and the accompanying drawings.

DETAILED DESCRIPTION

Figure 1:
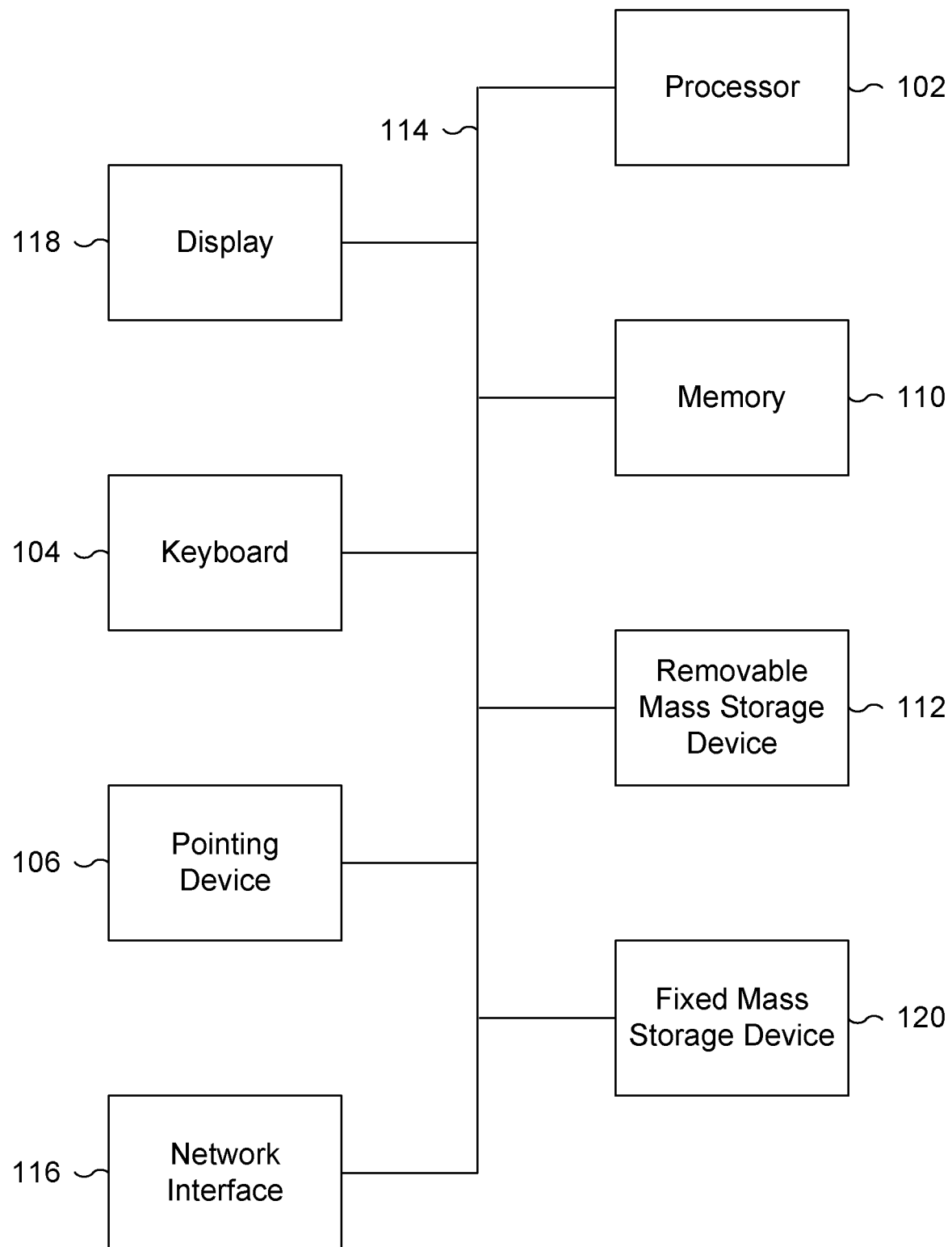
FIG. 1 is a functional diagram illustrating a programmed computer system for broadcast advertising in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Any person having ordinary skill in the art will recognize that while certain examples are given throughout this specification for radio broadcast networks and/or stations and corresponding audio media, without loss of generality the same principles and disclosed techniques may be applied to television broadcast networks and/or stations and corresponding video media. Without loss of generality throughout this specification "broadcasting" refers generally to the distribution of audio, video, and/or multimedia content in a one-to-many model via any electronic mass communications medium or combination of media including electromagnetic spectrum, over the air/terrestrial media, cable/coaxial/wired media, satellite transmission media, and/or computer readable media. Broadcasting may also refer to print broadcasting.

Thus, throughout this specification, "media" may refer to any form of information transmission, for example radio, television, other communication using electromagnetic waves, cable, and/or computer transmissions. Throughout this specification, "users" refer to any consumers of the content, including listeners and viewers of the content. Throughout this specification, "broadcast" may refer to any one-to-many communication, including: radio broadcast, terrestrial radio broadcast, satellite radio broadcast, cable radio broadcast, digital radio broadcast, television broadcast, terrestrial television broadcast, satellite television broadcast, cable television broadcast, digital television broadcast, broadcast over electromagnetic waves, broadcast over electromagnetic signals, broadcast over coaxial cable, broadcast over twisted pair cable, and broadcast via dynamic billboards or signs.

Any person having ordinary skill in the art will recognize that while certain examples are given throughout this specification for radio broadcast networks and/or stations and corresponding audio media, without loss of generality the same principles and disclosed techniques may be applied to television broadcast networks and/or stations and corresponding video media. Without loss of generality throughout this specification "broadcasting" refers generally to the distribution of audio, video, and/or multimedia content in a one-to-many model via any electronic mass communications medium or combination of media including electromagnetic spectrum, over the air/terrestrial media, cable/ coaxial/wired media, satellite transmission media, and/or computer readable media. Broadcasting may also refer to print broadcasting.

Thus, throughout this specification, "media" may refer to any form of information transmission, for example radio, television, other communication using electromagnetic waves, cable, and/or computer transmissions. Throughout this specification, "users" refer to any consumers of the content, including listeners and viewers of the content. Throughout this specification, "broadcast" may refer to any one-to-many communication, including: radio broadcast, terrestrial radio broadcast, satellite radio broadcast, cable radio broadcast, digital radio broadcast, television broadcast, terrestrial television broadcast, satellite television broadcast, cable television broadcast, digital television broadcast, broadcast over electromagnetic waves, broadcast over electromagnetic signals, broadcast over coaxial cable, broadcast over twisted pair cable, and broadcast via dynamic billboards or signs.

The example of radio is given now, but these principles may be applied for example to television similarly.

FIG. 1 is a functional diagram illustrating a programmed computer system for broadcast advertising in accordance with some embodiments. As shown, FIG. 1 provides a functional diagram of a general purpose computer system programmed to execute broadcast advertising in accordance with some embodiments. As will be apparent, other computer system architectures and configurations can be used to execute broadcast advertising. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard-disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Advertising and Broadcast.

Figure 2:
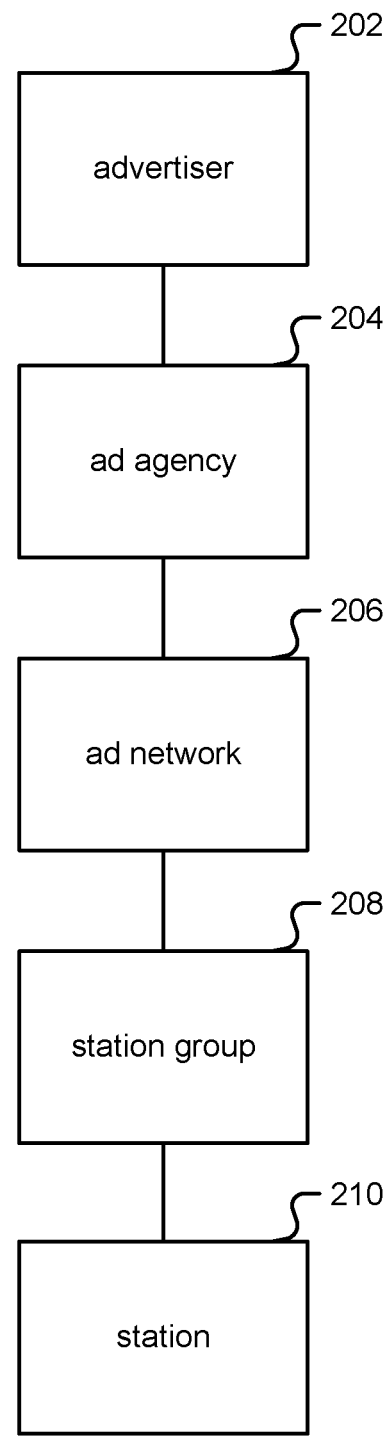
FIG. 2 is a hierarchical diagram illustrating example parties involved in the creation and placement of an ad for broadcast.

FIG. 2 is a hierarchical diagram illustrating example parties involved in the creation and placement of an ad for broadcast. A national Advertiser 202 has one or more products, services, and/or messages as advertising on broadcast media. Advertiser 202 retains an ad agency 204 to develop the ad campaign. For the purposes of this specification the ad campaign may be a national campaign or a regional campaign. An ad campaign may include one or more Request For Proposal ("RFP") specifications. An RFP specification may include targeting information, including demographics, markets, market characteristics, weeks, and periods of each week. An RFP specification may also include sizing specifications, including a flexible combination of budget limit, impressions goal, or impressions per price rate limiters. Impressions and/or impacts are a measure of the audience of a station when an ad is broadcast, and are statistically determined by companies such as Arbitron/Nielsen via diary or automated listeners, for example by the hour. An RFP may request impressions in terms of Gross Ratings Points ("GRP"s) in a specific demographic wherein 1 GRP is 1% of the national population within the specific demographic. For example if an ad campaign requests 2 GRPs for women aged 18-45, and it is determined that 65 million women are aged 18-45 nationally, then the ad campaign requests 2% of 65 million or 1.3 million impressions within that demographic.

The ad campaign also comprises one or more ad-creative assets, for example audio creative suitable for a radio ad, video creative suitable for television, and online creative suitable for internet distribution. In some embodiments, advertiser 202 comprises an internal ad agency team 204 within the same corporation.

Ad agency 204 then retains an ad network 206 for publication and/or distribution of the ad campaign. An ad network 206 manages a portion of the placement spots available on multiple broadcast stations 210. Each broadcast station 210 may be independent of the ad network 206 or may be part of the ad network 206. The ad network 206's inventory is the collection of placement spots available on the broadcast media of each broadcast station 210. As will be further elaborated, each spot comprises a position, for example a day of week and/or a daypart (for example, 'AM Drivetime', 'lunch', 'PM Drivetime', or 'evening'). Ad network 206's inventory may be acquired based on direct affiliation with specific broadcast stations 210 and/or may be acquired based on affiliation with station groups 208 comprising multiple broadcast stations 210.

The Ad Network.

Radio stations typically have relatively fixed ad breaks, typically twice per hour. A full break might be 5 minutes long, with 4 minutes of advertising. Stations 210 attempt to fill most of each ad break with local advertisers as these tend to pay substantially more to the station 210 than national-product advertising by advertisers 202. However, stations 210 usually do not have enough demand to fully fill the ad-placement spots they have. These ad spots are thus called a station's inventory. The station 210 will thus contract out a portion of their inventory to an ad network 206. The ad network 206 mediates between a large group of stations 208, 210 and national advertisers 202. An ad network 206 may be necessary because the logistical overhead of advertisers 202 interacting directly with stations 210 would be prohibitive for both stations 210 and advertisers 202.

Station Inventory.

Figure 3A:
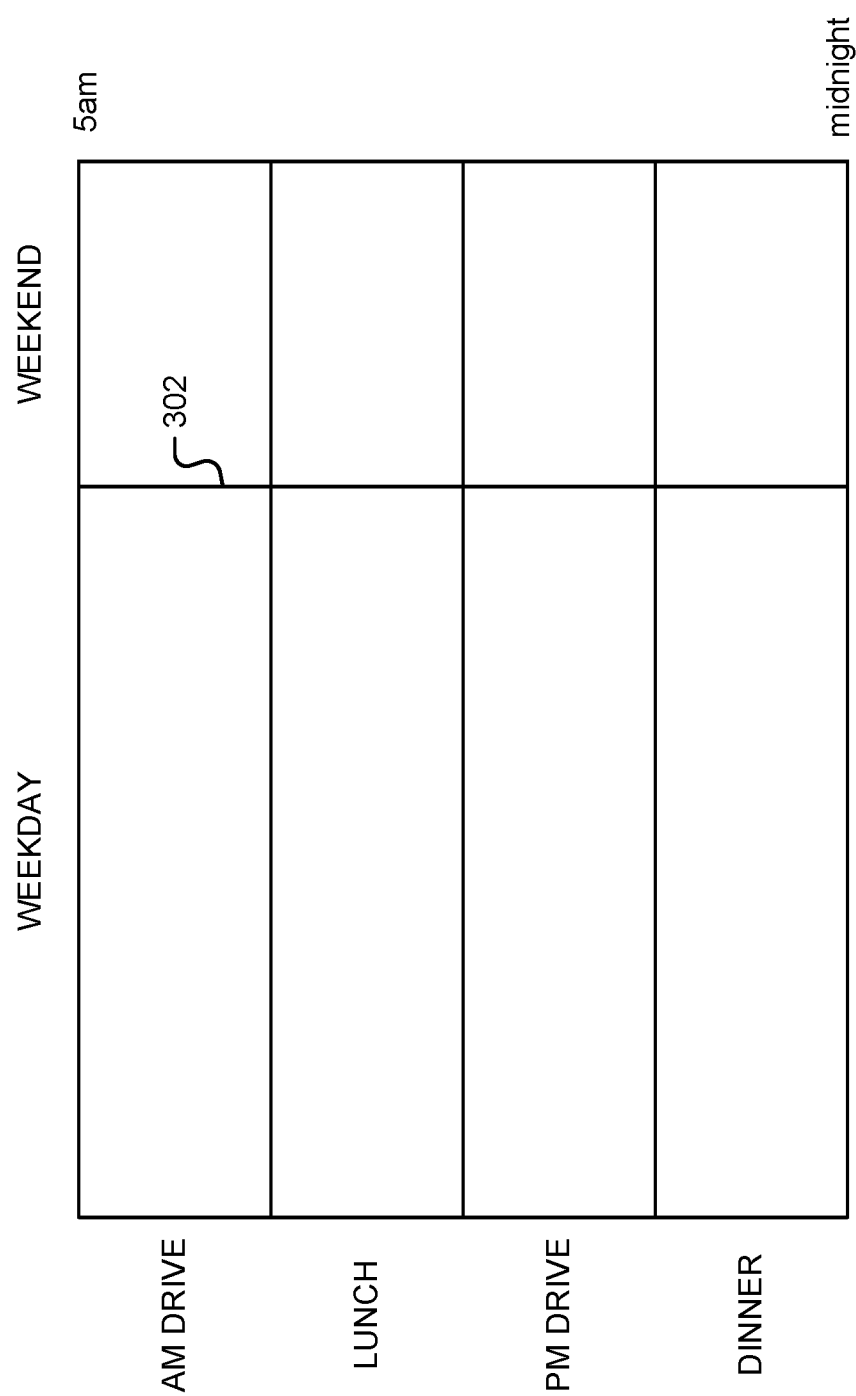
FIG. 3A is an illustration depicting radio broadcast dayparts.

FIG. 3A is an illustration depicting radio broadcast dayparts. In a radio embodiment, the station 210 typically provides the ad network 206 with inventory for each week, for example twenty-eight pieces of inventory. Each of the seven days of the week has an inventory for four typical dayparts: AM Drive (referring to the morning drive time to work for commuters), Midday, PM Drive (also known as afternoon drive time), and Evening. An inventory is specified by giving the part of the week it covers called a "daypart" 302, the number of ad breaks it contains and the seconds duration each break is to last.

For example, an inventory might cover the "Monday 5 a-10 a" daypart (referring to 5 am to 10 am on Monday), and contain two 60-second breaks. This would indicate that the station agrees to play one minute of the network's ad content (an "ad break" from the network's perspective) at two points during the daypart Monday 5 a-10 a. However, the station 210 does not explicitly state when they will play the breaks, only that they will not play them too close together, for example within 25 minutes of each other. The coarseness of the contract allows the station 210 to retain some flexibility with where it places its network ads, while still allowing the network 206 to place advertisers' ads into the part of the day they desire.

Dynamic Station Inventory.

Figure 3B:
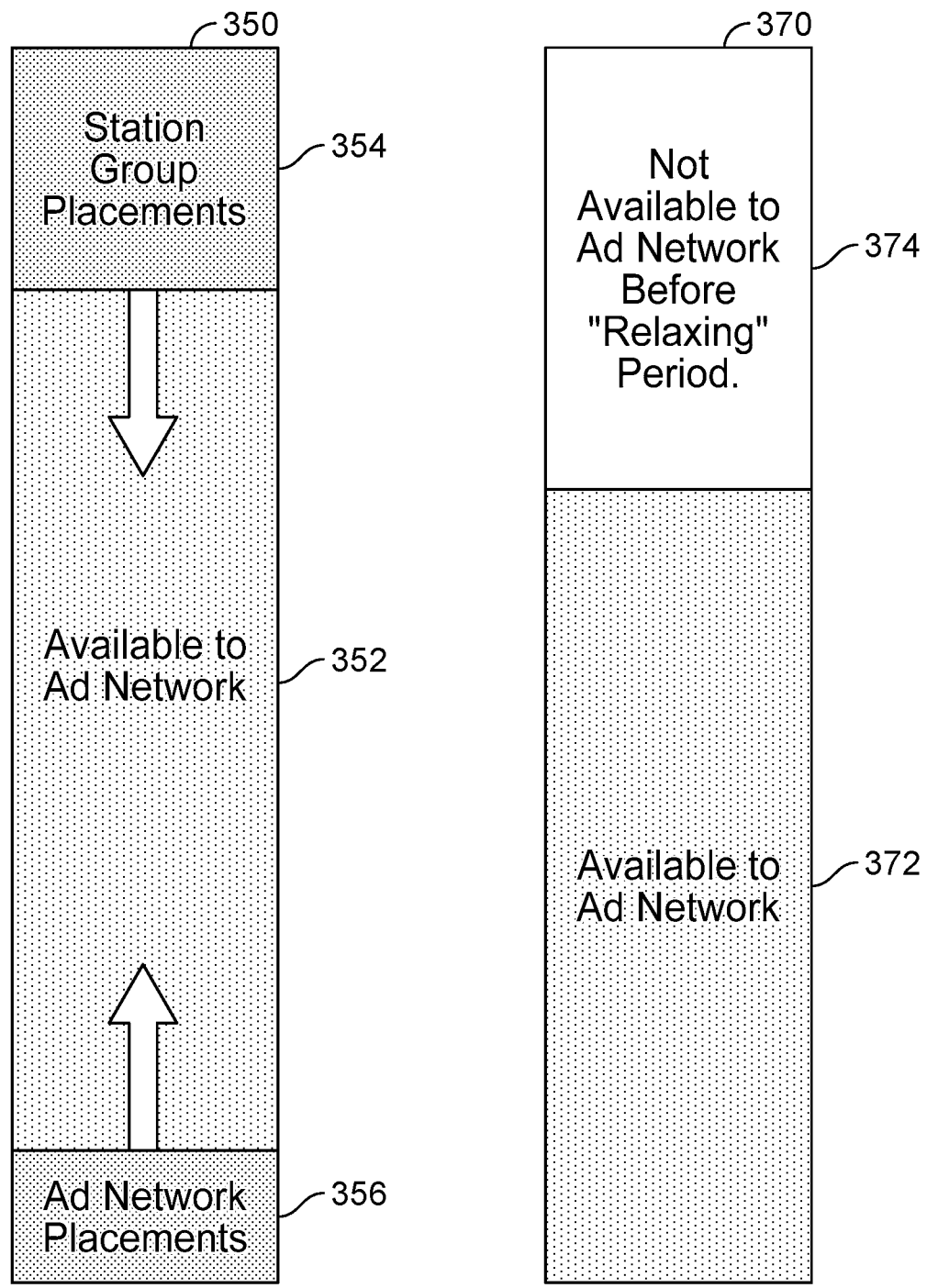
FIG. 3B are illustrations depicting dynamic inventory.

FIG. 3B are illustrations depicting dynamic inventory. Dynamic inventory refers to an inventory/supply that may change over time as third party ad network 210, for example ones using traditional placement, remove or put back inventory into a total inventory.

In one embodiment, a "meets in the middle" dynamic inventory is used: a third-party ad network and/or station group has a total station inventory/station group inventory 350 that it makes completely available to an ad network 210 using disclosed techniques for advertising placement. The third-party ad network and/or station group placements 354 reduce total inventory 350 just as the ad network 210 placements 356 reduce total inventory. In this embodiment little or no ads are reserved at the beginning of a placement cycle to the third-party ad network and/or station group. At a point, for example two weeks before a broadcast time, the remaining inventory available to the ad network 352 is split between the two groups to "meet in the middle" whether the middle refers to a straight 50% split of total inventory 350, remaining inventory 352, or any other threshold/dynamically calculated multiple besides 50%.

In an alternate embodiment, a "relaxing" dynamic inventory is used: a third-party ad network and/or station group has a total station inventory/station group inventory 370 that it makes a percentage available 372 to an ad network 210 using disclosed techniques for advertising placement. The remaining percentage is not made available to ad network 210 in an effort for internal/other sales. At a period of "relaxing", for example two weeks before a broadcast time, the remaining inventory 374 not consumed by placements is released to the ad network 210 and may be split between the two groups using a similar split as the "meets in the middle" dynamic inventory.

A Single Campaign.

A broadcast network 206 may represent inventory from hundreds or thousands of stations 210. When an advertiser 202 approaches them about running an ad campaign, the advertiser 202 may specify directly or indirectly what demographic, for example Women 18-49 or w18-49, and daypart they would like to play in and how many impressions they would like to get. The advertiser may specify a wide daypart such as Monday-Friday 5 a-10 a; that is, a daypart does not need to be on a single day. The daypart can also be complex, specifying several parts of the week: "Monday-Friday 5 a-10 a; Monday-Friday 3 p-8 p". The network 206 then determines how large a campaign they can sell the advertiser 202 and presents the plan to them as a proposal. If the advertiser approves, the plan becomes booked.

In one embodiment, a campaign plan moves between four business-process states: saved, proposed, reserved, and booked:

Saved—When the ad network 206 has formed a plan but has not yet presented it to an advertiser 202 for their approval, the plan is "saved". Because a saved plan has not been externally published yet, the network 206 is typically free to alter it as much as they want.

Proposed—Once the ad network 206 presents a plan to an advertiser 202 for their approval, the plan is "proposed". Proposing the plan means that the network 206 gives up much of its flexibility to alter the plan going forward. However, as the plan has not yet been committed to by the advertiser 202, the network 206 does not reserve the inventory the plan uses.

Reserved—Often times, the network 206 has reason to be confident that an advertiser 202 is likely to approve a plan, or at least, a plan very similar to it. In that case, the network 206 can go ahead and reserve the inventory while they wait for approval to be sure that no other plans end up taking those inventory spots.

Booked—Once the advertiser 202 has committed to a plan, it is booked, which means that the plan, in addition to reserving certain spots, is approved to actually play as well.

Typically, when a broadcast station 210 fills up their advertising spots with ad-campaign placements, they quickly run out of space and may not fit additional campaigns into the fragmented bits of inventory remaining. The fragmented bits that remain may not be used because each advertiser 202 prefers to have their campaign to play a substantial amount within specific dayparts. This station 210 level fragmentation loss affects the stations' 210 overall inventory, not just the inventory they have given to ad networks 206, and constitutes one major source of lost value.

By analogy, imagine that a restaurant only received parties of ten to twenty people. Additionally, each party was specific about which parts of the restaurant they were willing to sit in. After a few large parties are seated, the remaining seats will be a patchwork that may not fit any additional parties.

The situation may be worsened for the ad network 206, which represents hundreds to thousands of stations 210. The ad network 206 may attempt to solve an analogous fragmentation puzzle involving the inventory slices from each of its affiliated stations 210. The ad network 206's inventory thus is often 20% to 30% unsold simply because the inventory has been fragmented into an incoherent jumble. When inventory goes unsold, the broadcast media is filled with lower performing filler such as non-profit and/or government messages such as public service announcements that do not contribute substantively towards the station 210, station group 208, and/or network 206.

Currently, ad distribution and delivery in the broadcast industry is "pen and paper" or manually performed, due at least in part to an entrenched history of how it has been done, and due to the heterogeneity of broadcast stations throughout a country. The technologies, process, culture, and business concerns of stations may vary dramatically, necessitating a lowest-common-denominator approach where hundreds of people at the ad network 206 directly interact, via phone or email, with several people at each of the hundreds or thousands of stations 210 that are in the network.

Typically, there is also little to no feedback loop on how well things were actually delivered. As a practical measure, agencies 206 and stations 208, 210 have a "don't ask, don't tell" policy when it comes to delivery problems, despite there being perhaps 20% to 30% under-delivery due to various problems. Examples of delivery problems are the wrong ad played, played at wrong time, or played next to a competitor's ad, or the ad was not played, played too poorly, or played when the broadcasting tower was broken, and so on.

With the complexity of matchmaking exceeding the practical limits of a manual pen-and-paper method, networks 206 typically cope by requiring that advertisers 202 buy a homogenized slice and/or bundle, called a "network minute", across all the stations 210 in their network 206. In this way, the inventory does not get broken up and things do not get complicated. While this does reduce complexity, it adds inefficiency. The advertiser 202 gets little say in who they target (for example, which stations 210) or when they play (for example, which daypart). Thus, using network minute delivery is completely unoptimized to what the advertiser 202 truly would want. As a result, the delivery is correspondingly less valuable to advertiser 202. This in turn lowers advertiser 202 demand, which may lead to waste inventory the network 206 again may not fully sell their inventory. Note that this potential loss due to unsold inventory is a loss in addition to poor matchup due to network-minute selling. That is, because there is no attempt to match the inventory to the detailed desires of the advertiser 202, the total value delivered by the inventory is substantially less than what it could be.

Typically, there are further complications. For example, ads that are placed in the same break may be compatible with each other. For example, two soft drink products from competing brands may not be in the same break. Some advertisers 202 do not want to share a break with what they consider to be a controversial product. Finally, some advertisers 202 do not want to be placed in what they consider to be controversial stations or controversial programs/hosts.

Typically, ad campaigns that last less than a week are rare. Usually they last for several weeks and end up competing for space used by other campaigns, which themselves may extend into a different set of weeks, stations, and dayparts.

Over the course of many months leading up to a particular week, the network 206 progressively learns about each campaign that would like to include that week in their plans. For each potential campaign, they may first form a proposed campaign plan to present to the advertiser 202. Typically, it may be many weeks before the advertiser 202 commits to the plan. Advertisers 202 often wait to commit until just a week or two before the go-live time, when the week in question starts.

A common issue is answering what the network 206 does with the inventory spots they assigned to the proposed campaign plan before the advertiser 202 commits. If the station 210 reserves that inventory for the advertiser 202, then they may not assign it to other campaigns. Acceptance rates are often as low as 30%, and that means opportunities may be missed. If the network 206 does not reserve a proposed plan's inventory, then other campaigns can be accommodated more flexibly. However, conflicts may occur if two plans eventually try to reserve/book some of the same inventory spots. In fact, if the network 206 does not reserve the inventory, then it is almost guaranteed that by the time the advertiser 202 commits, the network 206 will have to present a slightly revised plan to the advertiser 202 since some of the original plan will be "damaged" by other plans from other advertisers and must be "healed".

Healing is a process of repairing damaged plans by selecting alternative but equivalent placements. Automatic healing may be an important feature to support a frictionless workflow process for a fluctuating inventory pool. Possible use cases include using healing to mitigate inventory changes and/or mitigate lost competition with another plan. Anchored re-planning is a process of creating new plan revisions. Possible use cases include responding to change requests from a buyer, mitigating inventory changes, and/or mitigate lost competition with another plan. Anchored re-planning has at least three modes: a rigid mode allowing only decrements; a rigid mode within a spot's original station, week, and daypart—to allow an incremental spot count; and a "prefer" mode that prefers the original station, week, and daypart—to allow incremental stations.

Traditional Methods.

The need to allocate ad plays into a 210 station's inventory spots has been around almost as long as radio has. As mentioned earlier, even today this is almost always done "by hand"/manually, with a highly experienced person determining with pen-and-paper/simple spreadsheets where they can place allocations for a new campaign. A problem is that each campaign has specific and differing placement and sizing requirements from the next campaign. The result is that the campaigns form a patchwork on the 210 stations' inventory that breaks up the inventory into unusable remnants. As mentioned before, in some cases this can lead to 20% to 30% of a 210 station's inventory going unfilled by paying advertisers 202 each week.

Broadcast Vs Online Media.

Generic scheduling/allocation systems or ad-delivery processes used in mediums other than broadcast are not the same as the broadcast inventory-fill problem. There are several unique characteristics of the broadcast ad distribution problem. In online media (for example browser/websites and/or phone apps), ads are directed at individual people with known demographics. By contrast in broadcast, an ad reaches thousands of people simultaneously (usually publically), creating a demographic pattern of impressions. In online media, the upcoming amount of impressions is not guaranteed because one may not be certain of how many people of each demographic will visit a website or smartphone app. By contrast in broadcast, the number of impressions is effectively guaranteed because the industry has settled on official estimates of listenership based off of sampling polls.

Figure 4A:
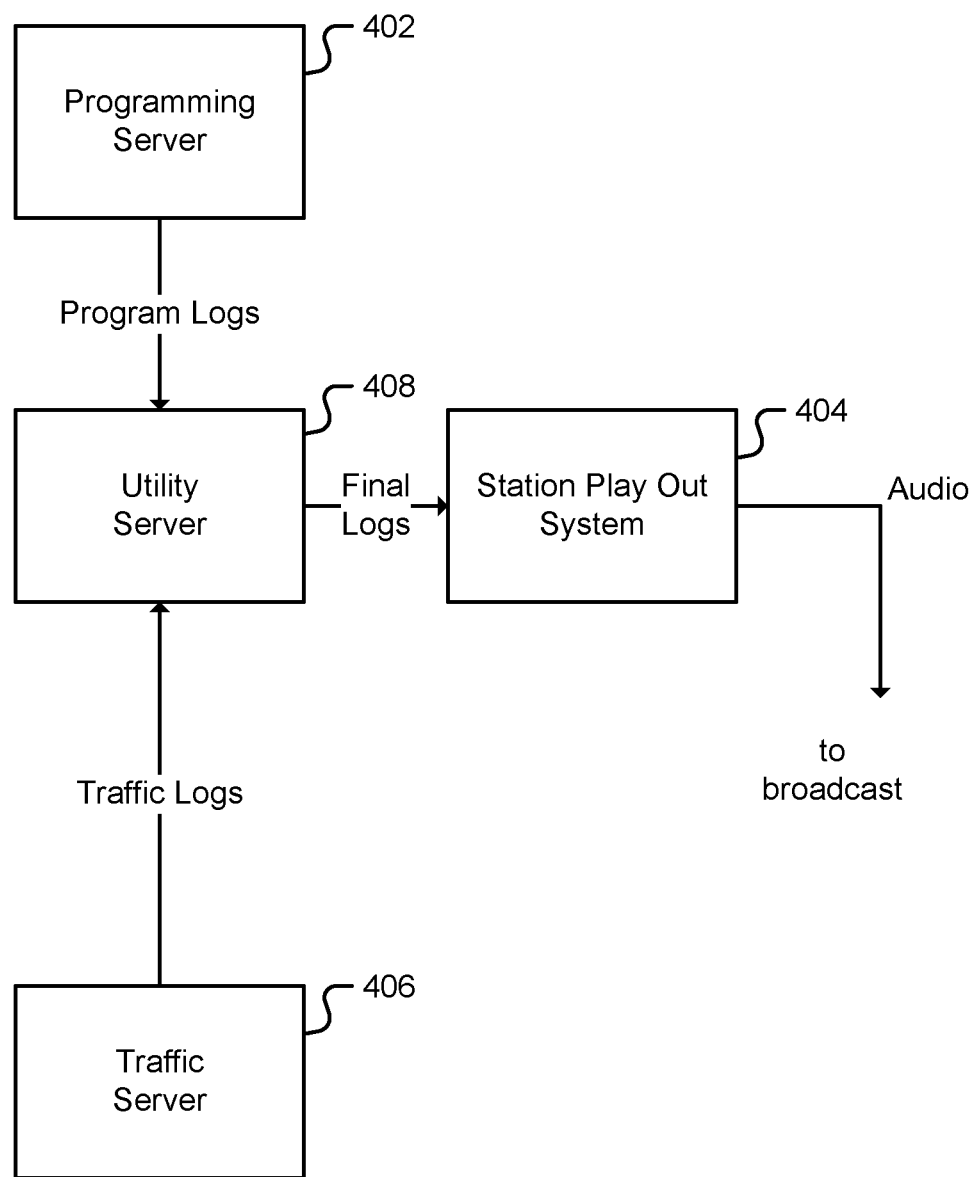
FIG. 4A is a block diagram illustrating a traditional broadcast system.

Sidecar Appliance. FIG. 4A is a block diagram illustrating a traditional broadcast system. The system of FIG. 4A may be at a station 210. In the example shown, 402 is a programming server. Throughout this specification, "programming" refers to core content of the broadcast station, usually content that is more valuable for broadcast consumers, for example listeners or viewers of the broadcast. Throughout this specification, "server" refers without loss of generality to either an internal or external system/platform and may be implemented in software and/or hardware. Thus, a utility server 408 and station play out system 404 may be housed within a single computer as shown in FIG. 1.

A programming server typically has access to pre-recorded or live programming content to be interleaved with traffic and/or ad content. Programming server 402 is coupled with a utility server 408 via program logs, which are generally human-readable files, for example text files, that indicate log book and/or timing details for "carts", which are cartridges and/or unique identifiers for specific creative pieces, including programming, commercials, weather, news, top-of-the-hour announcements, and other programming. For example cart COM-2537 may be a 30-second advertisement for a national home-improvement store with a 10% promotion. Program logs contain information on carts like PRO-1024 which may be a Top 40 popular song that happens to take three minutes and fifty-one seconds. The program logs may also store information for disc jockeys (DJs) such as artist, title, track, rotation, and trivia information about the cart.

Similarly, traffic server 406 provides traffic content. Throughout this specification "traffic" content refers to content other than programming, for example traffic reports, weather reports, local news, FCC mandated spots, such as top-of-the-hour, and local/network/national ad spots. Traffic server 406 is coupled to utility server 408 via traffic logs. Traffic logs contain information on carts like the example of COM-2537 above, or WEA-1100 which may have the eleven o'clock weather report for forty-five seconds.

Utility server 408 provides a merge and/or continuity function to form final logs that are the program logs from programming server 402 and traffic logs from traffic server 406 merged for final play out. The final logs are submitted to station play out system 404, also known as a primary play out system, or an automation system. Without loss of generality, the automation system may include both utility server 408 and play out system 404. The play out system has an audio codec and the capability to directly push content to broadcast.

Typically logs, based on schedulers' log books, are generated a day prior to a broadcast airing and have a predetermined schedule of triggering traffic via the play out systems 404 and 408. This is an issue in that logs are static by being generated so early, and that audio copy may not be changed in real time.

Figure 4B:
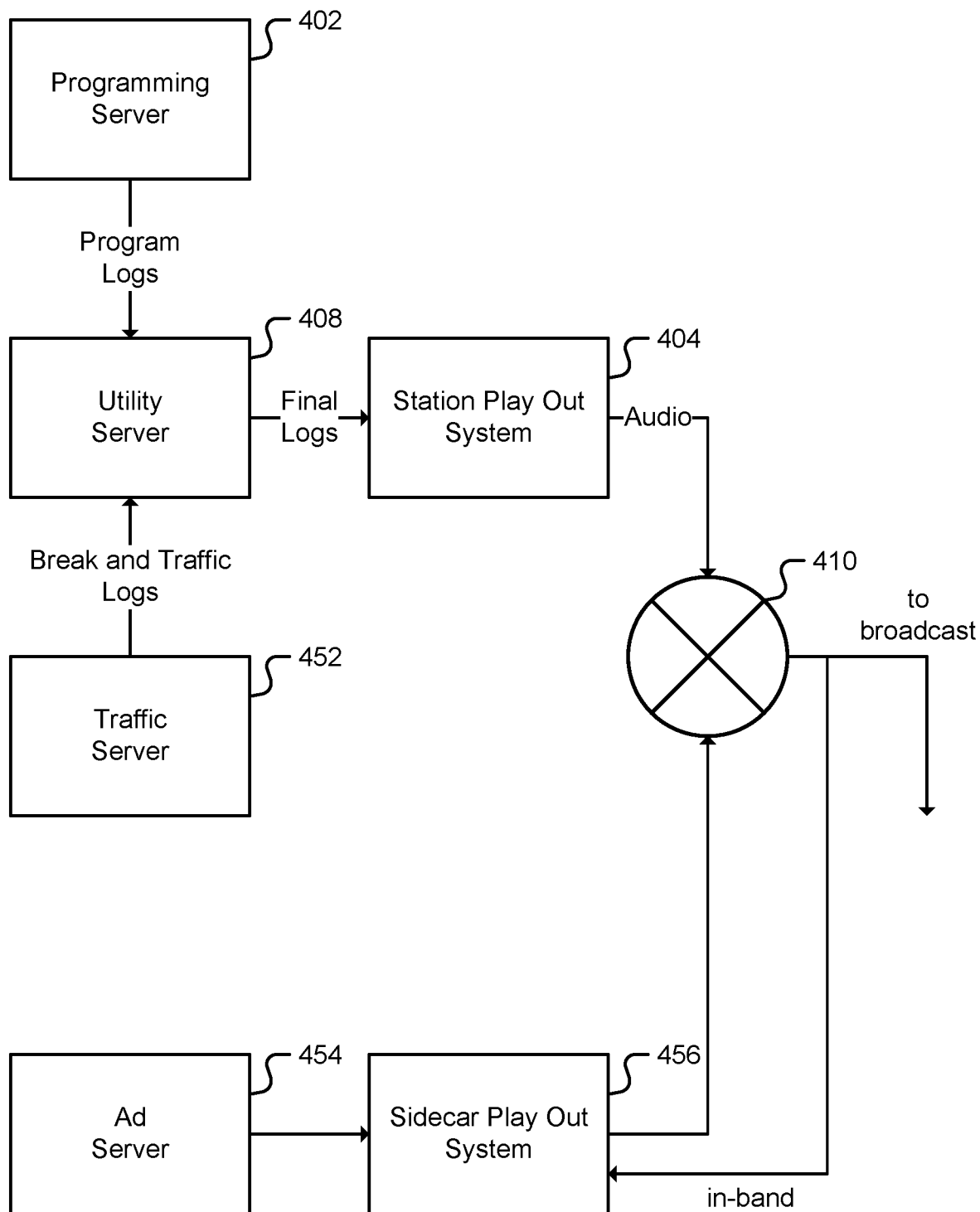
FIG. 4B is a block diagram illustrating an example of a sidecar-appliance broadcast system.

FIG. 4B is a block diagram illustrating an example of a sidecar-appliance broadcast system. The system of FIG. 4B may be at a station 210 affiliated with ad network 206. The sidecar appliance permits ad network 206 to trigger and play spots at station 210 in real time. In the example shown, similar to FIG. 4A, programming server 402 is coupled with station play out system 404 via utility server 408 which is coupled with mixer 410. One traffic server 452 providing, for example, commercial breaks, traffic, and weather reports, is also coupled with station play out system 404 via utility server 408 to provide some but not all of the traffic content for broadcast, and it leaves room for another traffic server using "break" logs. Another traffic server, also known as an ad server 454, is coupled with another second play out system 456. In one embodiment, the ad server 454 is a cloud based platform, wherein cloud refers to cloud computing. Cloud computing refers without loss of generality to the practice of using one or more remote servers hosted on a computer network, for example the Internet, rather than only using local servers and/or local personal computers. Although traffic server 454 is depicted as an ad server, without loss of generality the same in-band trigger techniques may be used for non-advertising content. Because sidecar play out system 456 has its own audio codec, and ad server 454 may be cloud computing based including associated with the internet, it provides a way for media creative to be loaded and scheduled in real time to be merged with the day-old programming logs of a traditional broadcast.

Furthermore, because sidecar play out system 456 can listen to in-band program audio, it can provide real time compliance data to a cloud platform, for example ad server 454. This allows an advertiser 202 or ad agency 204, to verify a creative spot was played in full, what time it was played, when it was played in the logs (for example what program was played prior to the creative spot being played), and the frequency it was played. Sidecar play out system 456 does not need to have an auxiliary network for triggering but may rather directly monitor the output of mixer 410, in-band. When sidecar play out system 456 detects and decodes an in-band trigger, it directly plays content based on instructions and audio copy from ad scheduling server 454 to mixer 410 and out to broadcast.

Improving on the Manual Process with the Sidecar Appliance.

Thus in one embodiment, a real-time media-delivery sidecar appliance 456 is installed in over a hundred broadcast stations 210. Each broadcast station 210 may then be affiliated with one or more ad networks 206. This allows delivery of a selected ad to the right spot directly into the radio/television broadcast station's broadcast stream at nearly any desired time. Thus, serving ads from the appliance computer permits a near immediate reactiveness to desired additions, changes, and removals in ad campaigns. This level of proactiveness/reactiveness is not at all practical in the "by hand"/manual approach.

That is, even if a network had an army of people transferring existing placements to attempt to fully fill their network, the complexity may boggle the army of people. The constant stream of ad-placement changes would have to be communicated to independent people at hundreds or thousands of radio stations; and not only would these people reject the idea of constantly making adjusts, they would not be able to do so reliably. This hypothetical situation is further exacerbated by the fact that a week's inventory is at its worst gridlock just before the week's go-live time.

Thus, the sidecar appliance 456 allows a fresh solution for the inventory-fill problem at a detailed level that only an automated system/computer can handle, rather than with the traditional broad-stroked methods that a person or persons can realistically apply manually. By computerizing the process, a new tool is forged to dynamically place campaigns' ads in a systemic way that concurrently explores all options and select the best one. The advertising placement system is thus a new problem space for broadcast inventory.

Context in Radio Embodiment.

To reiterate, ad networks (206) stand between a large group of radio stations (210) and national advertisers (202). Stations (210) contract out to the ad network (206) some of the space/spots they have available to place ads in, their "inventory". Advertisers (202) and/or their ad agencies (204) approach the ad network (206) asking for their products' ads to play many times across the ad network's stations (210), a "campaign". Planning that campaign requires considering the needs and desires of all three parties: stations (210), ad network (206), and advertiser (202). The planning software must optimize those needs and desires, and where necessary, compromise between them in a balanced way:

The station (210) and ad network (206) want to fully fill the inventory;

The ad network (206) and advertisers (202) want optimized return on investment ("ROI") from their campaigns; and Inventory and campaign delivery/success are measured in terms of impressions.

Impressions are the estimated number of people hearing the ad, given a particular demographic, such as "Men 25-49" or m25-49, "Women 18-24" or w18-24, both of which are subsets of the global demographic "Persons 12 and up", or p12+. One major third-party company providing these measurements is Arbitron, which is currently a part of Nielsen. Stations (210) are typically paid based on the estimated number of listeners in a generic demographic, such as "Persons 18-49" or p18-49. Advertisers (202) typically pay only for the impressions within the demographic they are interested in.

Thus, one of the major functions of an ad network (206) is to place an advertiser's campaign into the stations (210) at parts of the week that are best matched for the campaign's demographic. In other words, the network should optimize what is termed "demo-match" or "demo-matchup".

More sophisticated traditional ad networks may split their ad network (206) into many sub-networks. For example, they may split their network into stations (210) with mostly-male and mostly-female listenership. Some portion of their total inventory is then sold in this more detailed way. This is still not optimal however, because even amongst the mostly-female stations, only a minority of those stations may have good demo-match with "Female 18-25". Moreover, pre-splitting inventory into sub-networks comes with the risk that the corresponding sub-networks won't be sold at the same rate, leaving wasted inventory behind.

Embodiment of Dynamic Lineups.

Dynamic lineups are disclosed. In one embodiment, when planning a campaign, each inventory's impressions are measured according to the demographic and daypart of the campaign. This measure is termed the "in-demo impressions", or simply "demo impressions".

In one embodiment, a metric called 'price efficiency' is used to determine ad placement, wherein price efficiency is a ratio of total in-demo impressions per total cost. Maximizing price efficiency alone, however, may yield placement anomalies, for example undercharging early placements, overcharging late placements, evening/weekend daypart emphasis, and imbalance.

In one embodiment, the demo impressions are then compared against the overall-demographic impressions, or just "overall impressions", to calculate the demographic matchup, the "demo-match". The plan is then formed, one ad placement at a time, starting with the inventories that have the highest demo-match. One ad is added at a time because, as the plan is formed, many other criteria are being measured, some examples of which are listed below. A "Judge" is a term for a system which makes the determination in a price efficiency based placement system and/or a demo-match based placement system.

Balancers, distributors, and biasers are used to redistribute price efficiency based placement and/or demo-match based placement. These additional techniques/metrics are combined with the demo-match metric to form an overall fitness metric. The placement with the highest composite fitness is picked.

Some examples of these redistributors include:

market & station distribution—generally, advertisers want their campaign to play in as many markets as possible. For example, as one market becomes more saturated, an additional bias is to keep other markets equally saturated;

inventory rationing—encourages planning to pick stations/markets which have more unused inventory left instead of ones that have little inventory left;

index-impact adjustments—when a plan selects less popular inventory, it improves the overall quality (sometimes termed "index" in radio) of the remaining inventory. The reverse is true as well. This metric accounts for the impact that a placement will have on the index. It can be used to both shape how the plan ends up and/or to adjust the final price of the plan to the agency;

daypart distributor—using a "remnant prorated" method of calculating remnant inventory for a plurality of relevant regions for a campaign, and prorating what is being put into each of the regions, based on the total remnant inventory each region has; and daypart percentage annealing—when a planner selects percentages they prefer in each given region, the sequential process of selecting placements in each region will not result in the selected percentages after each selection, requiring an "annealing" process to grant a dynamic tolerance to avoid the selector from "seizing" at not being able to optimize to the selected percentages; and/or top station biaser—a planner may know in advance that certain stations are of interest to an advertiser regardless of data or quantitative analysis, for example a top station. A biaser may bias a campaign to allow the top station to be placed more often.

Figure 5:
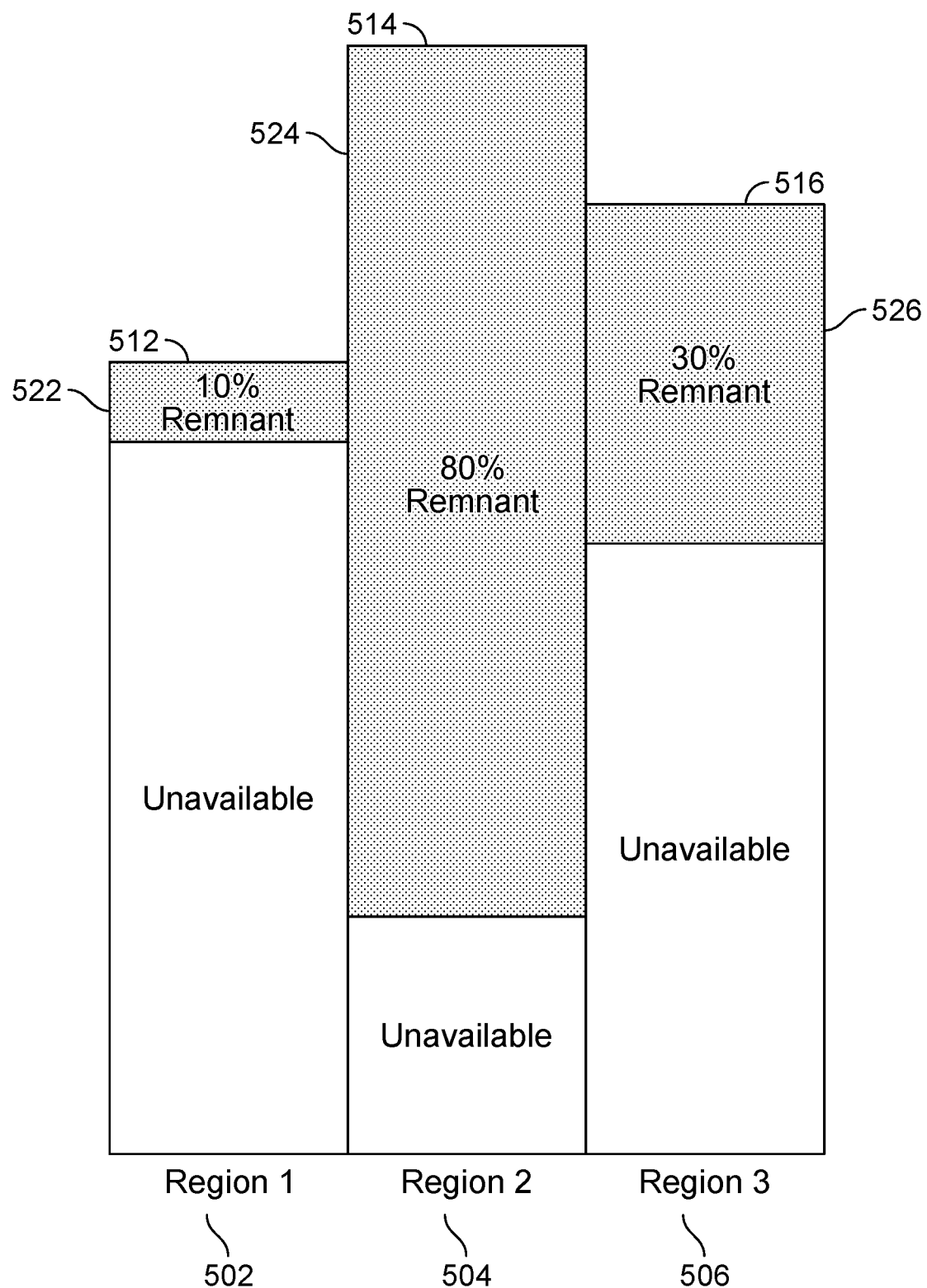
FIG. 5 is an illustration of remnant proration for a daypart distributor.

FIG. 5 is an illustration of remnant proration for a daypart distributor. Three regions are depicted, Region 1 (502), Region 2 (504), and Region (506), shown with a respective total inventory (512), (514), (516), and then a respective remnant inventory (522), (524), (526).

The term 'region' generally refers to a combination of space and time, for example a collection of selected market(s) and/or station(s) 210 and selected week(s) and/or daypart(s) 302. Price may stay the same within a region or between regions, such that without a daypart distributor a Judge may select only one region for placement, say Region 1 (502).

With remnant proration, the percentage of overall remnant available; for example in FIG. 5 10% in Region 1 (522), 80% in Region 2 (524), and 30% in Region 3 (516), is used to prorate what is put into each region, price being equal. Thus with a daypart distributor the Judge would select roughly 10/120 placement in Region 1, 80/120 placement in Region 2, and 30/120 in Region 3. An advantage of a daypart distributor is that it minimizes network fragmentation.

A key issue addressed by the disclosed is that each criteria seems qualitatively different from the rest, meaning there is no apparently natural way to combine them. In one embodiment, transforming and normalizing each metric into financial terms permits combining them in a continuously balanced way into a single fitness metric. This is key to avoiding complex, and often arbitrary, decision logic where "gray zones" are not properly balanced. A common issue with traditional methods, which are often non-mathematically balanced systems, is that they may seem good locally but when combined together they clash and are ineffective.

One example of how the demo-match metric alone might be used to pick one station over another: Consider a campaign that wants the w18-24 demo during the Monday-Friday 5 a-8 p daypart. Station X gets 1000 impressions per play in that demo and daypart, while getting 2000 impressions in the overall demo, p12+, in the same daypart. Thus, the demo-match is 1000/2000, or 50%. Station Y, on the other hand, gets 600 demo impressions per play and 900 overall impressions. Thus, Station Y's demo-match is 600/900, or 67%. The result is the demo-match algorithm weighs towards picking Station Y instead of Station X, and thus placing the campaign in Station Y is a 34% more efficient use of the inventory.

This level of detailed calculation may be leveraged with automated computer, and/or the complexity and customization that results can be reliably and inexpensively delivered via a direct-to-air appliance and cloud computing infrastructure. Traditional networks typically just allocate a fixed slice of their network's inventory to the campaign regardless of the demo match in each station and daypart.

Dynamic Lineups.

A "lineup" is an industry term referring to plays of a campaign that will happen in a given station in a given week. As described above, traditionally a lineup is governed at least in part by a manual and static placement of ads in inventory.

By contrast, lineups and placement as disclosed are "dynamic" in at least two different ways: 1) an initial placement of a campaign is dynamic using the overall fitness metric as described above; and 2) the campaign may be reoptimized/adapted dynamically after initial placement over the lifetime of the campaign with changes in region/demographic placement to react to changes of supply and changes of demand, for example inventory changes, campaign changes, and other new campaigns. Inventory changes may occur for example when a station has equipment failure. The campaign may change, for example, from feedback from a campaign, in some cases programmatically, to increase an ROI for advertiser 202. In one embodiments, a campaign runs during a week along a campaign period of six months to twelve months.

With adaptive planning, a planning algorithm may assume reserved inventory as guaranteed, but remain flexible within its ordered buy specifications. Adaptive/dynamic planning thus allows optimization of yield by reallocating existing placements to achieve higher fill rate or more efficient use of inventory. For example, an AM drive might yield more impressions for a later plan called Plan B: Plan A for Mo-Fr 6 a-tp reserved 30 spots evenly spread out (2 per day and AM/Mid/PM), whereas Plan B for Mo-We 6 a-10 a may force a reallocation of some spots of Plan A from AM into PM.

Benefits.

In one embodiment, customized "demo match" greatly expands the effective inventory available to an ad network. Stations are picked with the highest demo match for the campaign, leaving the lower demo-match stations and dayparts aside to be used by other campaigns whose desired demographic matches them. In some cases, the standard pricing in the industry allows perhaps a 10% margin for the network despite the inefficiency of their current practices. In one embodiment, computerized demo matching and campaign scaling allows the network to schedule perhaps 50% more advertising into a week. Since the cost to the network is relatively fixed, the network's margin would increase by 6 times in this hypothetical example.

Demo matching also benefits the business because advertisers prefer when their ads play on stations that naturally attract their targeted demographic.

Figure 6:
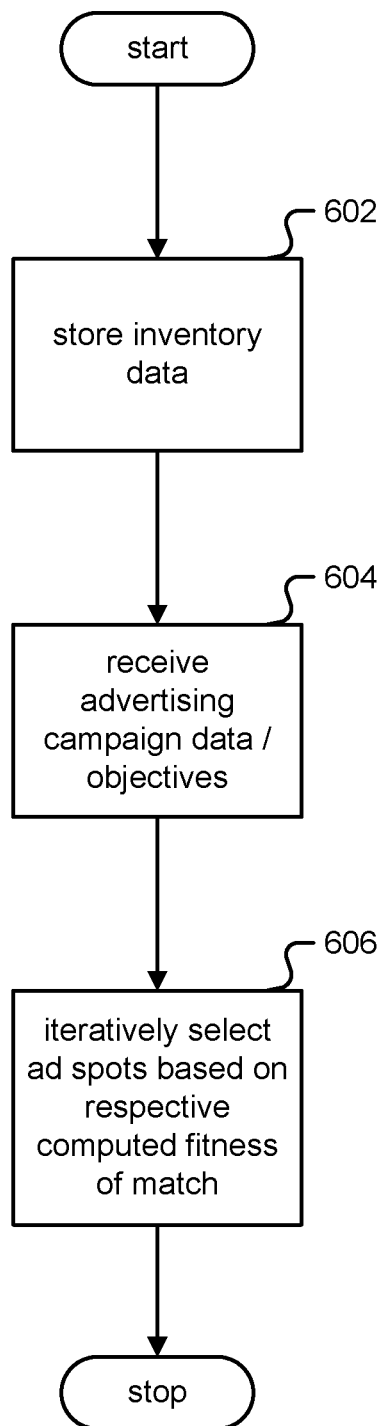
FIG. 6 is an illustration of a flow chart for an dynamic advertising placement.

FIG. 6 is an illustration of a flow chart for an dynamic advertising placement. In step 602, inventory data is stored, wherein the inventory data represents for each of a plurality of broadcast stations 210 a corresponding inventory of audio advertising spots available from that broadcast station 210 to be filled by an advertising placement system. In one embodiment the advertising placement system is run at a programmatic ad network 206 as shown in FIG. 2.

In step 604, an advertising campaign data is received from advertiser 202 and/or ad agency 204, wherein the advertising campaign data represents a set of advertising objectives of an advertising campaign.

In step 606, the inventory data is used to iteratively select advertising spots to be associated with the advertising campaign, based at least in part on a respective computed fitness of match between each selected advertising spot and said advertising objectives. In one embodiment the computed fitness of match comprises a primary metric comprising at least one of a demo-match metric and a price efficiency metric. In one embodiment, the computed fitness of match comprises the primary metric and a secondary metrics. In one embodiment, a secondary metric is transformed to a normalized value, for example a value normalized into financial terms such as price, cost, ROI, and so on. In one embodiment, a normalization strategy includes normalizing them all into financial terms so they can be combined together in a meaningful way to get the overall fitness. In one embodiment, the price efficiency metric is evaluated by efficiency in demo impressions for a given amount of money. In one embodiment, being evaluated by efficiency also comprises a bias to achieve a daypart distribution, for example the bias is remnant prorated. In one embodiment, being evaluated by efficiency also comprises an overall fitness including price efficiency and region distribution fitness.

In an additional step (not shown in FIG. 6) advertising spots are dynamically re-selected to be associated with the advertising campaign based at least in part on one or more of the following: a change in inventory and/or a subsequently processed campaign; recomputing the respective computed fitness of match, including at least one of: recomputing aggregated fitness and recomputing overall fitness; and to attain a same or equivalent fitness of match.

In an additional step (not shown in FIG. 6) the advertising campaign is globally optimized with a second advertising campaign. Such a globally optimization comprises at least one of: optimizing at least one of a supply side and a demand side across both advertising campaigns; achieving objectives of both advertising campaigns collectively with a maximum fill of ad spots; and/or achieving objectives of both advertising campaigns collectively with a maximum ROI to the plurality of broadcast stations.

As described above, the technique in FIG. 6 may be carried out by a computer as shown in FIG. 1 coupled by a network connection to a plurality of sidecar appliances 456 in each of the plurality of broadcast stations 210.

Figure 7:
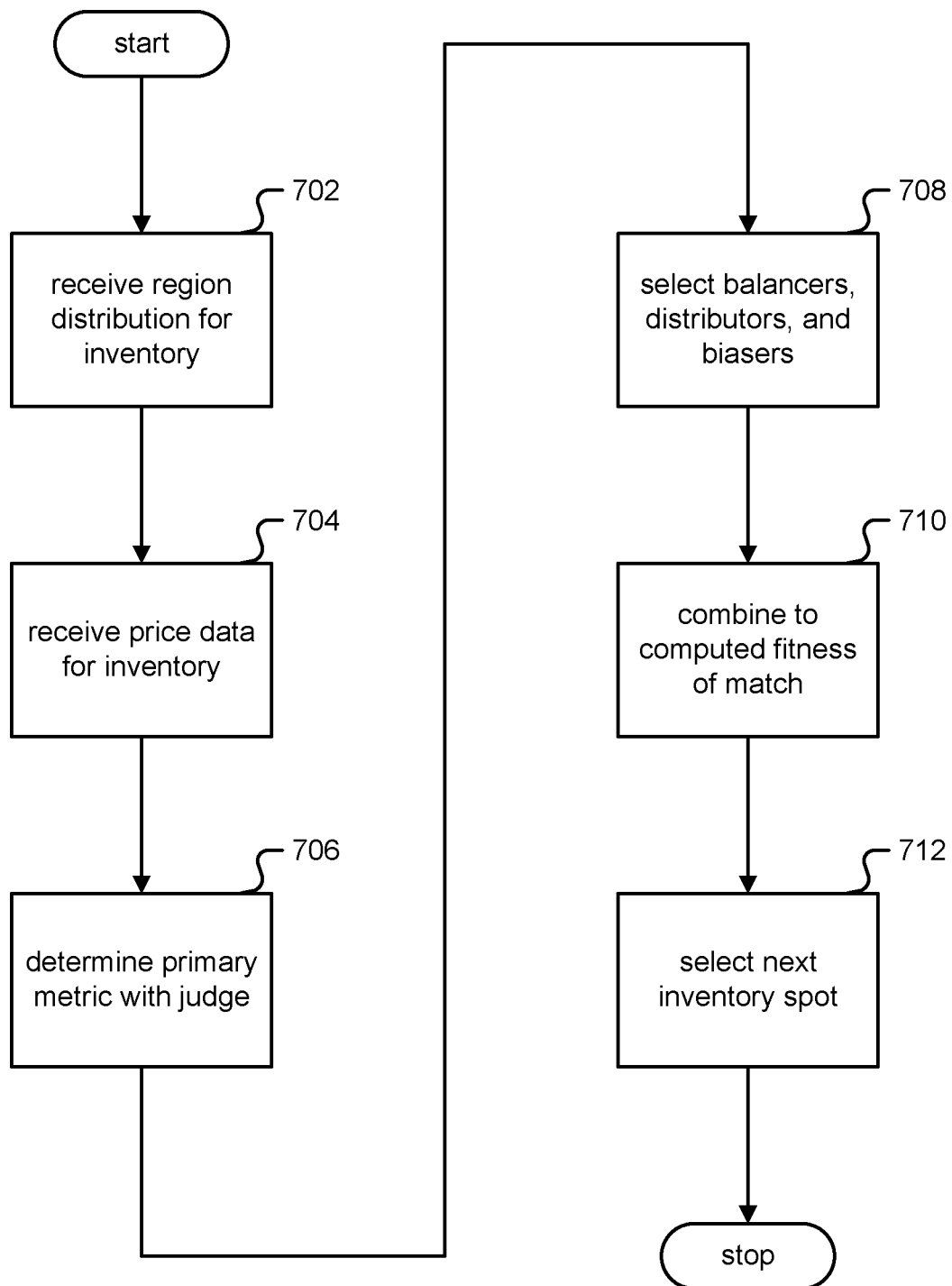
FIG. 7 is an illustration of a flow chart for selection of advertising spots.

FIG. 7 is an illustration of a flow chart for selection of advertising spots. In one embodiment, the process of FIG. 7 is part of step 606 in FIG. 6.

In steps 702 and 704, a region distribution for a campaign is received along with its corresponding price data. In step 706, a primary metric is determined for the campaign using a judge. A judge measures at least one fitness component. In one embodiment, a programmatic analysis of the campaign and/or user preferences determines whether the primary metric is price efficiency or demo-match. Price data may include CPM (cost per thousand impressions), payout AQH (average quarter-hour persons), and/or spot price. In steps 702 and 704, other determinants in inventory may also be input, including break length, break counts and:
Base input:
  a. inventory pool selection
  b. advertiser
Exclusions input:
  a. market
  b. format
  c. station
  d. other tags (e.g. controversial)
Ratings
  a. data set (e.g. Nielsen book)
  b. demographic
Multi config
  a. flight weeks
  b. dayparts
  c. spot length
  d. reach goal (Impressions or GRPS)
  e. rate limit (CPM or CPP)
  f. budget limit
  g. target weighting for markets, formats, stations, station ranks,
  h. demographics, household (income, size, education, children), flight weeks In step 708, balancers, distributors, and/or biasers are selected if any to affect failings or other challenges in using the primary metric alone for a campaign. In one embodiment, one or more judges are used, each measuring a fitness component. In one embodiment, balancers are elements that try to even out or balance different aspects of placement; distributors are elements that allow proration or redistribute placement; and biasers are elements that intentionally skew placement for quantitative or qualitative rationale. In one embodiment the balancers, distributors, and/or biasers are selected programmatically based on the campaign and/or user preferences.

In step 710, the primary metric and any balancers, distributors and/or biases are combined to compute a fitness of match. Combination may be a weighted function, for example a weighted sum of the normalized factors. Normalization to financial terms may be performed to provide a continuously balanced way to a single fitness metric. In one embodiment, there are multiple judges whose fitness calculations are combined to give the overall fitness in a selection phase. Once the overall fitness for each open spot is calculated, the best one is selected and then the overall fitnesses are recalculated again, for example for the new matches given of occupied spots.

In step 712, a selection phase is used to select the next inventory spot using the combined fitness of match metric.

In one embodiment, plan pricing includes the "natural price" of a plan as the sum of prices of its placements. The "proposal price" of a plan is the natural price adjusted by index factors that represent pool fragmentation:

$$\text{Price(plan)} = \left[ \sum_{placement} \text{Price(placement)} \right] \times \prod_{index} \text{factor}_{index} \frac{\text{index(plan)}}{\text{index(pool)}}$$

Index factors may be freely defined and may represent resources that positively impact pricing of the inventory pool, for example Top-10 markets, Top-5 stations. In one embodiment, there are different pricing options. The first is "cost based pricing" to support elastic pricing to achieve target margins based on a variable inventory cost structure. The price for an individual placement may be a function of the inventory cost multiplied with the configured target margin:

Price(placement)=[1+margin(tier,week,daypart)]× Cost(placement)

Thus, more expensive inventory in a pool may automatically increase plan prices and vice versa; changes to the effective pricing may be automatic.

A second may be "normalized impression-based pricing" to support controlled pricing for a buyer decoupled from cost structure. The price of an individual placement may be a function of its normalized impression multiplied with a configured eCPM (effective CPM):

$$\text{Price(placement)} = eCPM(\text{tier, week, daypart}) \times \frac{Imps_{normalized}(\text{placement})}{1000}$$

Target margins may be managed externally. Thus buyers may experience stable pricing, and changes to the effective pricing may become a yield management function.

For both pricing options, yield management has fine control over pricing through for example a three-dimensional matrix:

Cost-based option: Target margin per (tier×week×daypart)

Normalized impression-based option: eCPM per (tier× week×daypart)

Summary.

Matching campaigns to stations is one of the primary jobs, if not the primary job, of an ad network. However, because of the manual nature of traditional matching, the prevailing standard among ad networks is to simply sell "network minutes", meaning that an advertiser is only allowed to buy an even slice and/or bundle across the entire network, with no station or daypart customization done to match the desired demographic or other goals of the advertiser.

Despite its drawbacks, the network-minute model prevails simply because it requires substantially more effort to process in a more sophisticated way. Much more sophistication, and the process is beyond what a human being, and especially a huge distributed network of human beings, can reliably calculate or execute manually.

Thus, the algorithms disclosed are developed to support processes needed to produce completely detailed customization of campaign plans across a full ad network of hundreds to thousands of stations. Moreover, the processes developed herein are not simply a scaling up of the more holistic, intuitive reasoning that a human being might apply to the problem; instead, the processes disclosed are logically sound and tailored to the procedural and concurrent nature of computers.

Ad Exchange on Ad Server.

There traditionally is no ad exchange, wherein an "ad exchange" is defined throughout this specification as a space comprising demand and supply participants, traditionally available that is integrated and running on top of a real time ad server platform for linear broadcast, including linear broadcast radio or linear broadcast television. A linear broadcast ad server and/or enabling inventory to be dynamically supplied to exchange buyers to purchase is disclosed. The term "dynamically supplying" refers to supplying last minute and/or non-last minute inventory, freely changing the amount of inventory, freely changing the break lengths, and so on. In one embodiment, even pre-purchase and/or non-guaranteed inventory is supplied if it becomes available. In one embodiment the creative to run on broadcast may be supplied seconds and/or minutes after an order. In one embodiment high compliance is accounted for. In one embodiment, real time reporting, and real time invoicing are made available.

Inventory is allowed to be submitted to an ad exchange via a variety of methods that permit automation, including without limitation: application programming interfaces ("APIs"), applications, and direct interfaces. Buyers are allowed to purchase available inventory via a variety of methods that permit automation, including without limitation: APIs and direct buying interfaces. Proposals are created programmatically to buyers using buyer and seller rules and criteria. Once an order is placed, the campaign may run on all stations (via an appliance ad server) according to the specifications, creative, instructions, and so on.

When spots play out of the appliance ad server, the appliance reports the playtime and automatically confirms the spot play in lieu of traditional manual station affidavits or proof-of-performance reports. Campaign performance is provided to agencies and advertisers in real time, which also improves the efficiency of billing. Importantly, a programmatic exchange running on top of a cloud based, real time, ad server, enables efficiencies that are not possible manually using the traditional methods of using many people, disparate systems, and/or antiquated manual processes. With data, processing algorithms, and the ability to analyze, optimize, and re-plan every proposal/plan as new proposals/plans come in, value is added to all exchange participants—providing fair pricing to suppliers and buyers alike. Another strength over traditional exchanges is the disclosed exchange may work for many or a majority of all media groups.

In one embodiment, the ad exchange on ad server gets remunerated based at least in part on delivery of spots and SaaS/PaaS (Software as a Service/Platform as a Service) types of fees based on access to the exchange. Such a system is significant because of: a) the real time nature of the exchange; b) the benefits to both buyers and sellers; c) the assurance of buyer specifications, compliance, and control of copy; and d) the fact that traditionally is no industry wide ad exchange available for linear broadcast, or linear broadcast combined with streaming/online.

Figure 8A:
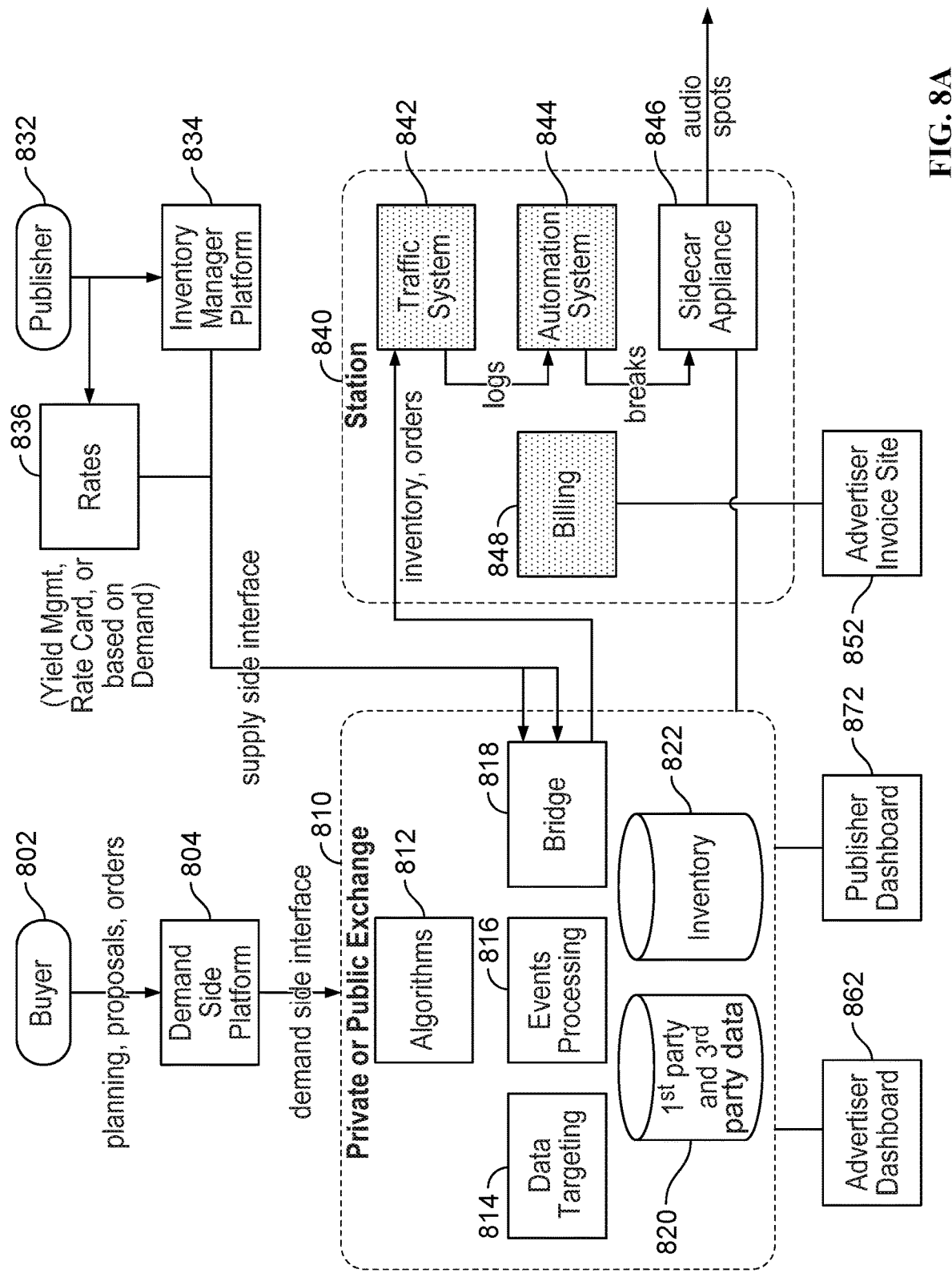
FIG. 8A and FIG. 8B are block diagrams of advertising exchange systems.
Figure 8B:
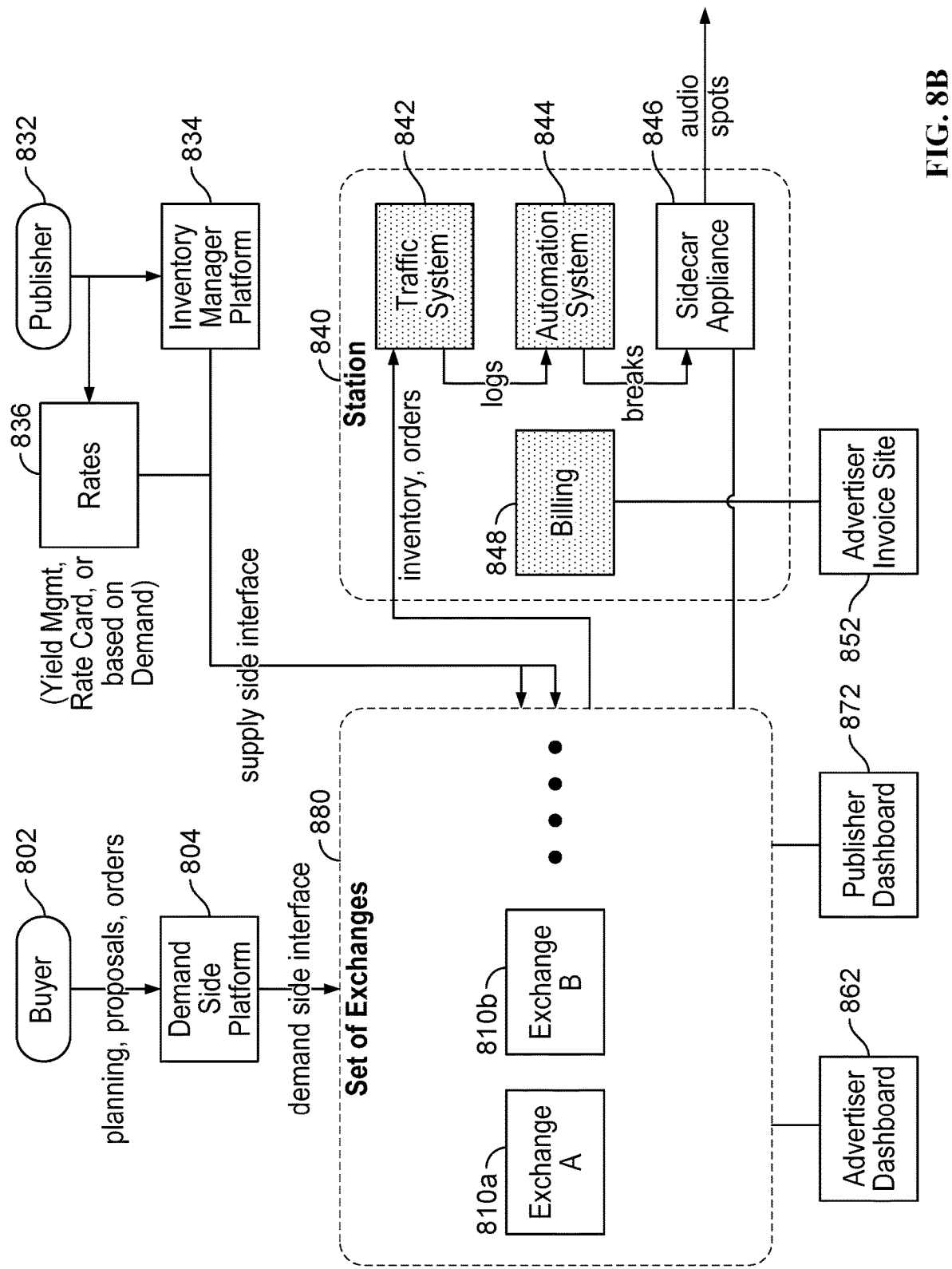

FIG. 8A and FIG. 8B are block diagrams of advertising exchange systems.

In FIG. 8A, Buyer 802 represents an advertiser 202, ad agency 204, and/or an ad network 206/station group 208 assisting an advertiser in purchasing adspace. The Buyer 802 submits campaign planning, proposals and/or orders with a demand side platform 804. Throughout this specification a platform references any programmatic user interface without limitation including a web site, web portal, mobile portal, mobile app, call center and/or computer program. In one embodiment the demand side platform may be represented as two different platforms: a first for an advertiser 202 and/or ad agency 204 to directly interface with, a second for a publisher 206/208 to interface buyers through. The demand side platform 804 interfaces with ad exchange 810 using a demand side interface, comprising programmatic interfaces such as an application programming interface (API), web service, computer protocol, and other automated and semi-automated interface standards.

Ad exchange 810 comprises algorithms 812, for example algorithms for dynamic lineup and/or placement. Algorithms 812 also may use advance techniques such as data targeting 814 to use first party data such as Nielsen data and/or third party data such as that provided by a publisher 820 to enhance targeting with more precise demographics, and so on. Algorithms 812 also may use events processing 816 to enhance delivery by allowing events such as weather events, political events, sports events, and so on to affect delivery and creative selection. The ad exchange 810 may be one or more of: a public ad exchange and a private exchange.

A private exchange 810 is associated with an inventory pool 822 that may be affiliated with a single owned and operated group of stations 210 and sold by the sales channel of that owned and operated group of stations. The ability to purchase on a private exchange usually requires an invitation to the agency 204 or advertiser 202. A public exchange 810 is associated with an inventory pool 822 that is comprised of inventory by a group of stations 210 owned by multiple owners. A public exchange may also require an invitation to agencies 204 and advertisers 202, but in some embodiments may also be completely public and allow any buyer to use a self service demand side platform 804 to purchase inventory from the public exchange 810.

Publisher 832 interfaces with ad exchange 810 using an inventory manager platform 834 to feed inventory 822 in the ad exchange 810. Publisher 832 also provides input in the form of rates 836, whether the rates are based on yield management, a rate card, or an instruction or algorithm to base rates on demand. In one embodiment, the ad exchange 810 takes an instruction/algorithm to base rates on demand and manifests it using algorithms 812 to provide a dynamic and/or responsive rate. The publisher 832 using the inventory manager platform and inputs rates to a bridge 818 on the ad exchange 810 using a supply side interface, comprising programmatic interfaces such as an API, web service, computer protocol, and other automated and semi-automated interface standards.

A station 840 affiliated with publisher 832 comprises preexisting systems, shown in FIG. 8 as grey blocks: traffic system 842 which produces logs for automation system 844, and billing 848 which invoices to an advertiser invoice site 852 for campaigns associated with ad exchange 810. The traffic system 842 interfaces with bridge 818 for generic inventory and orders: in one embodiment, the traffic system is given the number of breaks, the length of breaks (e.g. 30 s or 60 s), and an identifier to associate the order with a programmatic ad network 206 that is associated with ad exchange 810.

Automation system 844 then signals breaks to sidecar appliance 846, which is coupled with the ad exchange and submits audio spots directly for listening. Exchange 810 using the information from sidecar appliance 846 is coupled with an advertiser dashboard 862 for reporting, accounting, and QA to advertiser/buyer 802, and likewise coupled with a publisher dashboard 872 for reporting, accounting, and QA to publisher 832.

FIG. 8B is similar to FIG. 8A but with a set of exchanges 880 that shows for a buyer 802 and/or purchaser 832 the same single demand side interface and/or single supply side interface may be used with the set of exchanges 880, such that internally to the set of exchanges each exchange, shown in FIG. 8B as exchange A 810a, exchange B 810b, and so forth, interchange information appropriately. Thus, the set of exchanges 880 can manage information to permit a single buy from buyer 802 to be integrated over a plurality of exchanges (810a, 810b, and so on), and likewise on the supply side.

Figure 9:
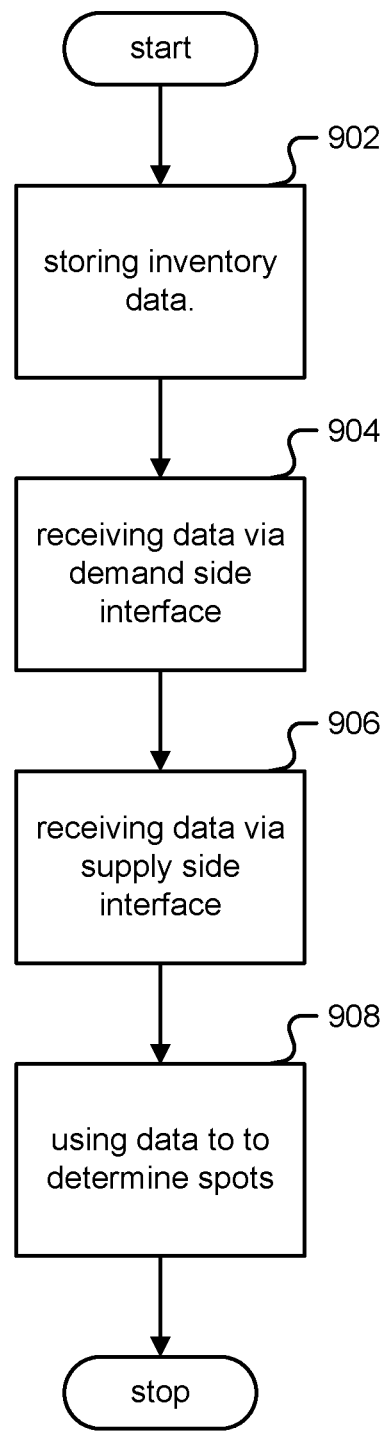
FIG. 9 is an illustration of a flow chart for an advertising exchange system.

FIG. 9 is an illustration of a flow chart for an advertising exchange system. In one embodiment, the flow chart of FIG. 9 is executed in ad exchange 810 in FIG. 8.

In step 902, inventory data is stored representing for each of a plurality of broadcast stations a corresponding inventory of audio advertising spots available from that broadcast station to be filled by an advertising placement system. In one embodiment, inventory data representing for each of a plurality of streaming stations a corresponding inventory of audio advertising spots available from that streaming station to be filled by the advertising exchange system.

In step 904, one or more sets of advertising campaign data, each representing a set of advertising objectives of an advertising campaign is received via a demand side interface. In one embodiment, the demand side interface is coupled to a plurality of broadcast advertisers.

In step 906 the inventory data is received via a supply side interface. In one embodiment, the supply side interface is coupled to a plurality of broadcast stations. In one embodiment, the supply side interface is coupled to a single private set of broadcast stations representing a private inventory data pool. In one embodiment, the supply side interface is coupled to a plurality of sets of broadcast stations representing a public inventory data pool. In one embodiment, the supply side interface is coupled to a single private set of broadcast stations representing a private inventory pool. In one embodiment, the supply side interface also has an ability for a broadcast station to review upcoming advertising campaigns to perform at least one of: separation, blacklisting, and charging differential pricing.

In step 908, the inventory data is used to determine for each advertising campaign a corresponding set of advertising spots to be associated with that advertising campaign. In one embodiment, the determination is made "last minute" within two weeks before a play date for the corresponding set of advertising spots. In one embodiment, the determination is made by programmatically optimizing globally across two or more of said advertising campaigns. In one embodiment, the determination is programmatically based at least in part on a respective fitness metric computed for each advertising campaign.

In one embodiment, the determination is programmatically based at least in part on a respective fitness metric computed for each advertising campaign, wherein the computed fitness is demo-match. In one embodiment, the determination is programmatically based at least in part on a respective fitness metric computed for each advertising campaign, wherein the computed fitness is demo-match plus an additional metric. In one embodiment, the determination is dynamic by making a rolling adjustment to optimize globally as another advertising campaigns is added. In one embodiment, the determination is dynamic by making a rolling adjustment to optimize globally as another advertising campaigns is added throughout a week. In one embodiment, the determination is based at least in part on an overall optimization of an advertiser side and a broadcast station side; the overall optimization may include choosing an alternate plan for each advertising campaign an alternate corresponding set of advertising spots to be associated with that advertising campaign in the event that a better return benefits one or more broadcast stations given a same utility to an advertiser.

In a step not shown in FIG. 9, a plurality of sidecar appliances in each of the plurality of broadcast stations are used, wherein the plurality of sidecar appliances are coupled to ad exchange 810 by a network connection, wherein a sidecar appliance auto-generates instructions to implement an advertising campaign.

Exchange Platform 810 in Detail.

In one embodiment, the Radio Exchange Platform 810 is an advertising technology platform that enables the automated trading of broadcast audio inventory. It may provide a robust set of features and capabilities to operate independent inventory pools, each with a unique set of rules that govern the process of planning, forecasting and transacting inventory. The configuration of each independent pool with its rules is called an Exchange. There are at least two kinds of exchanges, Private versus Public.

Private Radio Exchange.

In one embodiment, a Private Radio Exchange is a configuration of the Radio Exchange Platform 810 that allows one inventory supplier 832 to control the rules that govern all programmatic buying of the inventory 822. Availability, pricing, and packaging may be fully controlled by the supplier 832, often at multiple levels, e.g. global yield management versus channel optimizations. This may include client-specific configurations and pre-negotiated pricing. Private Radio Exchange capabilities may be licensed to suppliers 832, such as broadcasters 210 and/or networks 208/206, who may then run their own private exchanges. A supplier 832 is the principal owner of the inventory and defines the trading rules on their own exchange 810.

Public Radio Exchange.

In one embodiment, a Public Radio Exchange 810 is a configuration of the Radio Exchange Platform 810 that facilitates trading of inventory 822 between multiple suppliers 832 and multiple buyers 802. An approved supplier 832 may flexibly publish inventory 822 into the public exchange 810 with an offer. An approved buyer 802 may acquire inventory 822 from the public exchange 810 with an order. A supplier 832 can set price floors and content restriction for individual offers but may or may not control large granularity pricing and packaging. A buyer 802 may order based on targeting requirements and audience goals but may not have visibility into or control over specific attributes; including but not limited to the actual station 210 identity. In one embodiment, a programmatic ad network 206 does not necessarily take principal ownership of the inventory traded and may instead charge a fee from transactions.

Buying Methods.

In one embodiment, the Radio Exchange Platform 810 provides at least three methods of buying; all of them programmatic in nature. They vary in core characteristics: 'Tool-supported RFP/IO Process' and 'Programmatic Guaranteed' are methods to facilitate programmatic buying of premium, guaranteed inventory. 'Static Bidding, Non-Guaranteed' is a method to facilitate programmatic buying of remnant inventory.

|  | Tool-Supported RFP/IO Process | Programmatic Guaranteed | Static Bidding, Non-Guaranteed |
|---|---|---|---|
| Premium and/or guaranteed inventory | X | X |  |
| Remnant and/or non-guaranteed inventory |  |  | X |

Buying Methods for the Private Radio Exchange.

In one embodiment, the Private Radio Exchange 810 provides two buying methods to support premium sales channels. Both may be guaranteed and transparent in nature. The buyer 802 may review proposed orders, including the properties (stations) and weights (impressions or play counts), before committing to the order.

Tool-Supported RFP/IO Process.

In one embodiment, the tool supported request for proposal/insertion order (RFP/IO) process utilizes the efficiencies and optimizations of the programmatic platform but still allows human interaction and negotiations on individual buys. To allow this interaction, the workflow may follow a more traditional RFP submission process:

1. Buyer 802 sends RFP with audience goals and targeting requirements to supplier 832.
2. Supplier's 832 personnel creates price proposals in response to incoming RFPs.
3. The Radio Exchange Platform 810 facilitates the communication of the proposal to the buyer 802, either through direct web access from the buyer 802 or through automatically generated sales-supporting documents delivered via traditional methods like email.
4. Buyer's 802 personnel reviews proposal and either requests changes or approves the proposal.
   i. If buyer 802 request changes, supplier's 832 personnel repeats step 2.
   ii. If the buyer 802 approves the proposal, the ad exchange 810 generates an insertion order and reserves the inventory 822.

Programmatic Guaranteed.

In one embodiment, a Programmatic Guaranteed process supports an automated, self-service buying process. The supplier 832 may configure comprehensive pricing rules, rate cards/deals 834/836 to manage yield, protect sales channels, and manage client-specific pre-negotiated deals. Those rules may allow buyers 802 to query available inventory on a real-time and/or near-real-time basis 822 and make orders without a direct human involvement from the supplier 832. This is termed self-service buying. The actual order is booked either through a web-based application or an API that can be integrated by 3rd-party buying applications, for example demand side platforms 804.

Buying Methods for the Public Radio Exchange.

In one embodiment, the Public Radio Exchange 810 provides a unified way of buying remnant inventory. The term "remnant" does not imply poor quality, but instead refers to a fragmented, inconsistent and variably sized pool of inventory from multiple independent suppliers (that may in fact be premium/ideal for certain buyers 802), published to a unified marketplace 810 for purchase.

In one embodiment, the Public Radio Exchange 810 provides a marketplace where transactions are executed by an auction mechanism. To participate in an auction a buyer 802 enters an order with a static bid. The order will be considered in upcoming auctions until the order is changed or canceled.

The Public Radio Exchange 810 does not necessary need to offer a real time bidding (RTB) mechanism. RTB requires the Exchange 810 to query distinct bids from registered buyers 802 for every unit of auctioned inventory 822 at the time of the auction, for example near real time. This may be an inconvenience for buyers 802 of audio advertising.

Static Bidding, Non-Guaranteed.

In one embodiment, characteristics for a static bidding, non-guaranteed process on the Radio Exchange Platform 810 comprise:

1. Suppliers 832 create offers of inventory into the public exchange. With each offer, the supplier 832 can specify content restrictions, the level of accepted targeting and a minimum price for the inventory unit;
2. Buyers 802 place orders to buy inventory from the public exchange. Within that order the buyer can specify audience goals and maximum unit price (the 'bid'). In addition, the buyer 802 may specify targeting parameters including—but not limited to—dayparts, markets and formats;
3. Offered inventory 822 becomes due for auction when the earlier of the following events occur:
   a. the offer has a "good until" time configured and is about to expire; and
   b. the inventory is scheduled to air within a minimum time-to-air (As a guiding principle, the public exchange may delay the auction to the latest possible time to maximize the matching demand and consequently optimize yield for the supplier 832 as well as available inventory 822 for the demand side 802. In one embodiment, to practically process the order, send instructions to the ad server 846 and achieve highest compliance, the system reserves a technical minimum time-to-air buffer);
4. When inventory 822 becomes due for auction, the public exchange 810 completes the auction process by computing a winning bid (or winning bids in the case of multiple simultaneously auctioned units). The following steps describe the auction process:
   a. Determine the set of eligible orders. This step includes:
      i. matching orders against content restriction of offers,
      ii. matching offers against audience goals and targeting requirements of orders,
      iii. filtering out orders with bids lower than the offer minimum price, and
      iv. applying global and order specific rotation and repetition rules.
   b. From the set of eligible orders, the platform computes a winning bid or winning bids. The algorithm may have the following properties:
      i. bidders are incentivized to bid their true value (as described for second-price sealed-bid auctions and similar algorithms),
      ii. seller's revenue is maximized, and
      iii. auctions are fair and equal.

Non-Guaranteed Nature.

In one embodiment, orders are "non-guaranteed" to the buyer 802, that is the Exchange 810 accepts orders but does not guarantee delivery. However, upon a successful auction (see above) the supplier 832 will guarantee the delivery to the matched buyer 802 and the buyer 802 consents to buy matched inventory 822. The buyer 802 can change or revoke his order at any time, which will be respected for future auctions but will not affect any auction results from the past.

In one embodiment, offers are non-guaranteed by the supplier 832, that is the supplier can at any time revoke offers that have not been auctioned. Successfully auctioned offers are guaranteed as described above, and the Exchange does not necessarily provide any guarantees to the supplier 832 that inventory 822 will find a buyer 802.

Classification and Targeting.

In one embodiment, an order may include targeting information that will be matched against the inventory classification as published by the supplier 832. The Radio Exchange Platform 810 may assure the accuracy of classifications, but it is the choice of the supplier 832 to define the level and granularity of the classification on each offer.

A supplier 832 may opt-in to classify the inventory according to Daypart, Market, Station Rank and Format. By allowing such a specific classification the offer may achieve higher prices in the auction and may be less impacted by temporary inflation of low-cost, lower quality inventory. Without a proper classification the inventory may still be sold, but the buyer will value it solely on the achieved impressions.

In one embodiment, a summary of the characteristics of buying methods supported by the ad exchange 810 include:

|  | Tool-Supported RFP/IO Process | Programmatic Guaranteed | Static Bidding, Non-Guaranteed |
| --- | --- | --- | --- |
| Commitment | guaranteed | guaranteed | non-guaranteed |
| Transparency | transparent | transparent | non-transparent (blind) |
| Granularity | package (e.g. network) | package or individual units | individual units |
| Workflow | sales driven proposals and insertion orders | automated insertion orders | standby demand |

Ad exchange 810 may support other buying methods, for example:

"Buy Now" button: An extension to static bidding, suppliers 832 set a price target (higher than the minimum price) that would allow buyers 802 to circumvent the auction process and buy the inventory at that time. This includes a discovery mechanism so buyers 802 can find specific inventory in the exchange;

"RTB": An alternative to static bidding, auctions will trigger a dynamic bid request to registered buyers who dynamically respond with a bid response. The deal architecture resembles RTB exchanges for digital advertising. A buyer 802 may use sophisticated optimization algorithms and data that would change the true value of inventory for the buyer 802 dynamically. In one embodiment, the buyer 802 may use ad exchange 810 for the capability to adjust his bid on an auction-by-auction basis. Unlike in digital RTBs the ability to target individual profiles does not necessarily apply to broadcast but may apply for streaming/online. In one embodiment, a prospective buyer 802 might use technology that has standardized on OpenRTB. Another alternative to static bidding is a Reverse Auction;

"Priceline" model: An alternative to static bidding and/or programmatic direct. In one embodiment, an advantage of this blind model is its success selling unsold high-quality inventory, as translated to an advertising market with institutional, repeat buyers 802.

Inventory Management Platform 834 in Detail.

In one embodiment, the ad exchange 810 allows participating broadcast partners 210 to programmatically sell their inventory 822. This inventory 822 may be programmatically purchased by agencies 204 and advertisers 202 through DSP 804. Broadcasters 832 may provision inventory 822 to enable the marketplace 810. The Inventory Management platform 834, may be used to help broadcasters 832 provision inventory.

Structure.

In one embodiment, inventory management may have three types of users: Broadcast Group 208 Inventory Managers, Radio Group 206 Administrators, and Global Administrators from the programmatic ad network 206 without necessarily principal ownership of inventory traded. A Radio Group may be the sole supplier 832 of a private exchange 810 or represent a plurality of suppliers 832.

The Inventory Management Platform may provide a role-based and/or credential-based hierarchy that includes the three users: Inventory Managers at broadcast groups with an Affiliate Inventory Manager role; Admin personnel at the Radio Group with a Network Inventory Manager role; and internal admin personnel with a Global Inventory Manager role at the programmatic ad network 206 without necessarily principal ownership of inventory traded.

Broadcast Group Inventory Manager Interface.

For Broadcast Group Inventory Managers, a quick start guide may comprise: launching an Inventory Management tool by navigating to an applicable URL and logging in; clicking on any week to update inventory by entering Avails and CPMs; clicking on Save to update Inventory; using the Extend button instead of Save to extend this inventory to multiple weeks; contacting a Radio Group Administrator to convert Spot Rates to CPMs; and contacting Radio Group Administrator to take back inventory that is already booked by one or more plans.

Conventions.

A Radio Group may require use of standard day parts to ensure uniform inventory across the system. In one embodiment, twelve standard day parts are used: AM Drive (6 am to 10 am) Mo-Fr; AM Drive Saturday; AM Drive Sunday; Mid Day (10 am to 3 pm) Mo-Fr; Mid Day Saturday; Mid Day Sunday; PM Drive (3 pm to 7 pm) Mo-Fr; PM Drive Saturday; PM Drive Sunday; Evening (7 pm to 12 am) Mo-Fr; Evening Saturday; and Evening Sunday.

CPM Pricing.

In one embodiment, a Radio Group's tool(s) may require pricing inventory by CPM. CPM based pricing may make it easier to manage inventory across multiple stations and weeks. A Radio Group administrator may help translate Spot Prices in dollars to CPMs and assist with the initial inventory load.

In one embodiment, a calculation is RATE*1000/AQH, wherein: RATE is the 60 second Spot price; and AQH is based on P18-49, MSu 6 a-12 m. In one embodiment, the AQH is not related to the audience number of a plan being presented to advertisers but is a separate consistent audience number that is considered delivered for each spot run. This number is for calculation purposes and acts as the base, the real variable in the equation determining the cost is the spot rate. An identical sample AQH may theoretically be used as a placeholder for every station but using a true audience number may help cost analysis elsewhere. P18-49, MSu 6 a-12 m as a default is helpful as that is what Metrics uses for some calculations.

Setup and Inventory Load.

In one embodiment, broadcast groups may follow this process to get their organization set up and configured to use Inventory Management 834. It is assumed that the Broadcast group may have signed a Radio Group contract at this point.

Organization and User Setup.

In one embodiment, a Radio Group representative may work with the Broadcast group's contact to set up the organization and users within the Example Radio Group system. The following information may be needed to set up an organization within a Radio Group: Company Name; Address; and Point of contact name & email address.

A Radio Group representative may collect the list of Broadcast group personnel email ID's who may be managing the group's inventory. The Example Radio Group administrator may ensure that users are created within the system. Each email ID in the list may receive an email from an administrative support team with the subject "You have been invited to the ad exchange". The recipients of email may then click on the "Click here" link in the email to select a password and continue the user creation process and eventually receive confirmation of account creation.

Station Load and Template Association.

In one embodiment, the broadcast group's stations 210 may be loaded onto the system before inventory may be provisioned. The station load is performed by an Radio Group Administrator. Broadcast groups may provide the following information to ensure their stations are uploaded and associated with their organization: FCC ID of the station; Station call letter in the format EXAMPLE RADIO GROUP-FM; DMA of the station; Station's Format; If the station is controversial (e.g. Yes or No); If the station is unrated (e.g. Yes or No); and the Station's guideline for pricing 30 s as a percentage of 60 second spot.

The Example Radio Group Administrator may also create templates with standard Example Radio Group day parts and associates them with all the stations for ease of use. The template assignment may be done behind the scenes and may be transparent to the broadcast group's Inventory Managers.

Initial Inventory Provisioning.

Templated Inventory Provisioning: In one embodiment, a Radio Group provides templates to enable more effortless inventory provisioning. Broadcast groups may provide typical avails for both 30 s and 60 s along with CPMs for the standard Radio Group dayparts. The Radio Group Administrator may ensure this inventory is added to the template for a duration of time.

For example, if a broadcast group 208 is comfortable in sharing 4 slots in the weekday am and pm dayparts, 10 slots in their midday, evening and weekend dayparts, they may have a generic Spot Rate or CPMs for each of these dayparts as shown in the below table and may have this sample as inventory for the next quarter across all their stations. The Radio Group Administrator may then create a template as shown below and apply it to all stations for the upcoming quarter.

| Daypart | Length | Avails | CPM |
| --- | --- | --- | --- |
| Mo-fr 6a-10a | 60 | 4 | $8.00 |
| Mo-fr 10a-3p | 60 | 10 | $5.00 |
| Mo-fr 3p-7p | 60 | 4 | $7.00 |
| Mo-fr 7p-12a | 60 | 10 | $3.00 |
| Sa 6a-10a | 60 | 10 | $4.00 |
| ... | | | |
| Su 7p-12a | 60 | 10 | $4.00 |

Manual Inventory Provisioning.

In one embodiment, templated inventory provisioning may be suited for situations where all stations within the broadcast group 208 have similar pattern of inventory or prices. However it may not be the case for some broadcasters with diverse set of radio stations. Such broadcast groups may use the Extend tool to provision inventory. A Radio Group Administrator may be available to help the broadcast groups during this phase.

In one embodiment, an example user interface sequence is now given: the broadcast group's Inventory Manager may navigate to the platform 834 and log in to launch Inventory Management Tool. The stations may all display zero as provisioned inventory. They may select the station and start of the provisioning period. Avails and CPM sections may be available on the screen after the Inventory Manager clicks on a week. Avails may have the same numbers set up in the template; since the Extend based provisioning is being described, assume that the template may have zeros for all avails and the Inventory Manager platform may enter the Avails. CPMs may also be inherited from the templates. Assuming they too were zero in the templates, the user enters CPMs.

In one embodiment, an Inventory Manager may click on the Extend button above Avails section. The Inventory Manager may then enter the duration to provision inventory. For example, the Inventory Manager may elect to provision inventory starting from the week of February 29 and ending with the week of March 28. Clicking on the Save button may start the process of provisioning inventory. This process might take a few minutes to complete. Each week's cell may display the total number of Avails once the week's inventory provisioning is complete. Also note the totals may only reflected for the weeks with provisioned Inventory. The process may be repeated for each station to complete the process of inventory provisioning.

Ongoing Inventory Management.

Viewing Inventory. In one embodiment, Inventory Managers may navigate to the Inventory Management Portal URI and login to launch the Inventory Management tool. For example, Inventory Managers may view aggregate inventory. For instance, station EXMP-FM may have 74 spots for weeks February 29, March 7, March 14, and March 21, inventory is not provisioned for week March 28 and beyond. Inventory is not provisioned for the two other stations that the inventory manager may have access to for any of the weeks listed.

In one embodiment, Inventory Managers may click on any station and week cell to view inventory details. For example, the Inventory Manager may click on the week of March 7 and may view inventory details on a UI panel. An Avails widget may show the details of inventory by dayparts. For example, Monday to Friday 10 am to 3 pm daypart (mo-fr 10 a-3 p) may have a total of five spots provisioned. Of the five spots, four may be booked and one is available. Inventory Managers may provision both 60 s and 30 s spots.

In one embodiment, a CPM widget near the Avails widget may be used to update prices. Prices may be quoted in CPMs and may be distinct for each daypart. For example, Radio Group prices may be quoted for 60 second Spot in CPMs. The price of an 30 s may be a percentage of the price of a 60 s in the same daypart. This percentage may be indicated at the top of the CPM widget. The percentage may be fixed and/or variable and set up when the Radio Group Administrator associates templates with the stations.

In an example of a CPM widget, a price of a 30 second spot is set at 66% of an 60 second spot, and an AM drive daypart (mo-fr 6 a-10 a) costs $8.00 CPM. A Radio Group may only support pricing by CPMs, or support alternate pricings. Total prices may be calculated based off of fixed Payout AQH numbers entered by the Radio Group Administrator. The Payout AQH, although close to the actual AQH, may be different from actual AQHs published by Nielsen. The Payout AQHs entered by a Radio Group administrator may be used for the purposes of converting CPMs to Spot Rates. Inventory Managers may contact their Radio Group Administrator for additional details and to convert Spot Rates into CPMs.

Adjust Inventory.

In one embodiment, an Inventory Manager may have to adjust inventory for various reasons. They may want to increase inventory to reflect the demand generated by Radio Group, or they may want to reduce inventory sold through other channels. A ongoing process of inventory adjustment may be done easily by using the Avails widget and modifying the Avails to the desired number. For example, Monday to Friday 10 am to 3 pm daypart (mo-fr 10 a-3 p) may have a total of five spots provisioned, of the five spots, four are booked and one is available. The Inventory Manager may change the number of Avails to six and Save to increase the total number of Avails to ten. Or the reverse, the Inventory Manager may make the number of Avails to zero and Save to reduce the provisioned Avails to just four.

Take Back Booked Inventory.

In one embodiment, an Inventory Managers is prevented from reducing the Booked inventory which may damage plans via the Inventory Management tool. However in extreme cases, a Radio Group Administrator may manually return Booked inventory back to broadcasters. An Radio Group Administrator may be contacted to initiate this process.

Adjust Prices.

In one embodiment, an Inventory Manager may have to adjust prices to reflect business needs on an ongoing basis. This may be accomplished by selecting the desired week, updating CPMs, and clicking Save. Inventory Managers may update CPMs of 60 second spots, as prices of 30 second spots may be automatically adjusted based on percentage set up in the template. For instance, Inventory Managers may raise or lower CPMs of one or more dayparts and click Save. The prices may be reflected immediately in the system and available for planner to use. In one embodiment, updated prices may be used for future sales, as booked inventory may retain their prices when billed to the advertiser/agency 202/204.

Automated Give Back.

In one embodiment, Radio Group's policy may be that of giving back inventory two weeks before air time. This policy is enforced while the templates are being assigned to stations as 14 days. Thus, unsold inventory may be updated to zero at two weeks before air time. In other words, inventory sales may stop two weeks before air time. In one embodiment, ad exchange 810 supports sales until the 'last minute' within the two weeks before airtime until a day/hour/minute before airtime.

Ongoing Inventory Provisioning.

In one embodiment, an Inventory Manager may provision inventory for upcoming months or quarters using the Extend widget. The process is similar to initial provisioning of inventory, as described in the Extend widget based Manual Inventory provisioning section above.

Radio Group Administrator Inventory Manager Interface.

In one embodiment, Radio Group administrators with a Network Inventory Manager role also have all the capabilities of an Inventory Manager at a broadcast group.

Inventory Management.

Administrator Avail Widget. In one embodiment, a Radio Group Administrator's version of Avail widget differs from a Broadcast group's Inventory Manager's view. A Broadcast group's Inventory Manager may only modify unbooked inventory via the Avails column. In other words, a Broadcast group's Inventory Manager is discouraged from taking back booked inventory as it may damage plans. By contrast, the Radio Group Administrator may have the ability to take back booked inventory. One way to achieve this is by directly updating the Total column (Booked+Avail). The administrator widget may allow the Radio Group administrator to update the Total column.

Administrator Extend Widget.

In one embodiment, a Broadcast group's Inventory Managers may use the Extend functionality to provision fresh inventory. However they are discouraged from updating or taking back from existing inventory using the Extend widget. In other words, the Broadcast group Inventory Manager's version of Extend button is only enabled when all subsequent weeks have provisioned inventory. By contrast, a Radio Group administrator's version of the Extend widget may have the capability to both update and take back existing inventory. The Extend button may be enabled regardless of the provisioned inventory. Existing inventory or prices may be updated by updating the Total Column in the Avails widget, clicking on Extend button, selecting the duration and clicking on Save button. Clicking on the "Damage Plans" checkbox may force update the request across the entire duration and may damage plans as needed. In one embodiment, if this checkbox is not selected, the application may only update the inventory and prices for the weeks where it is possible to do so without damaging plans.

Take Back Booked Inventory.

In one embodiment, taking back booked inventory may be accomplished in two ways. The Avails widget may be used to update the Totals to any number. Once saved, the inventory total may force the system to take back booked inventory if needed. The Extend widget with the Damage Plans checked is a second option. The Extend widget makes it possible to quickly take back inventory from multiple weeks at once.

Station Management.

In one embodiment, a Stations section of Inventory Management exists to enable Radio Group Administrators to view all the stations. The list of stations may be filtered by using a Filters button/control. A Radio Group Administrator may filter the station list by one or more stations, partners (broadcast groups), or DMAs. The filtering tool may be convenient to view a subset of stations.

Unrated and Controversial.

In one embodiment, a Radio Group Administrator may mark stations as Unrated or Controversial and update these settings on Stations tab. These settings may be set using checkboxes.

Global Administrator Inventory Management Interface.

In one embodiment, Global Administrators have all the capabilities of both a Broadcast group's Inventory Managers and a Radio Group Administrator along with other specific administrative tools.

Quick Start Guide Stations.

In one embodiment, a Stations section may be used to upload and manage stations available within the Inventory Management platform for the selected Network. Global Administrators may click on Import Broadcasters link to upload a CSV file with stations. The uploaded station's controversial and ratings flags may be manipulated on this panel.

Templates.

In one embodiment, templates, also known as contracts, are a way to create standard and default inventory data. Global Administrators may create or update templates. An Ad Network's default settings may be set before creating a template, for example the dayparts and Give Back duration for a Radio Group network may be standardized.

Assignments.

In one embodiment, an Assignment section helps Global Administrators to assign templates to one or more stations; these assignments may be temporary with an end date or permanent. For example, template assignments may be done for a set period of time to allow of assigning new templates in future.

Inventory.

In one embodiment, an Inventory section may have the same exact privileges as a Radio Group Administrator but across all networks assigned. A Global Administrator may update inventory of any stations on all the networks assigned and may use an Extend widget similar to a Radio Group Administrator and may take back inventory even if it damages plans, or may limit damage by unchecking a "allow plan damage" box.

Demand Side Platform 804 in Detail.

In one embodiment, a Demand Side Platform 804 and its buying experience comprise: an application store for Picking Networks or Spot Marketplaces; an application store for Data providers for applicable Marketplaces; allowing a different Audience book than that based on Nielsen and using that for planning; different RFP screens for different marketplaces/data; providing rich results and/or export of data; and enabling different actions like Cancel/Replan/Split/Delete.

The Demand Side Platform 804 is described as a series of user stories and user scenarios below:

User Scenario 1: TOS and Approval of Seats for a Marketplace. In one embodiment, a user is a buyer for ad agency 204, and the Global Sales team representing the programmatic ad network 206 without necessarily principal ownership of inventory traded. One possible flow includes: Agency 204 approaches Global Sales Team 206; Global Sales Team provides DSP Terms and Services to Agency; once Agency agrees to DSP Terms and Services and signs contract with Network 206, Agencies may be connected with different marketplaces available on DSP; When a MarketPlace and Agency agree on TOS and sign a mutual contract, MarketPlace approves this Agency a seat and intimates Network 206. In one embodiment, these steps are all offline. Once the seat is granted, the Network 206 may create a account for an Agency 204 user who in turn may create additional users to DSP using the platform.

User Scenario 2: User is able to Login. In one embodiment, a user is a Planner and/or Agency 204 Self Service Buyer. A Planner may be from an ad network 206 and/or broadcast group 208 to help assist an advertiser 202 and/or ad agency 204 as a seller assisted model. One possible flow includes: a user goes to the DSP; user sees a login panel and may log in using the User Name and Password they have set as credentials.

User Scenario 3: Once Logged In, User sees different MarketPlaces. In one embodiment, a user is a Planner and/or Agency 204 Self Service Buyer. One possible flow includes: a user goes to the DSP; the user sees the both Spot and Network Marketplaces that they have access to. In one embodiment, a user only sees the Marketplaces they have access to. Logo and text for each private exchange 210 may be provided by the corresponding Broadcast Group. The logo and text may be customizable; for example a logo dimension should be least 300 px on short side of image (height or width), preferably 150-300 dpi or vector format, and text length specified to around 100 characters.

For example, a Radio Group may include both an Audience and Spot into one Radio Group MarketPlace. The DSP Landing page may then have both a Radio Group Marketplace representing private exchange 810, and a second public exchange 810. Upon clicking the Radio Group MarketPlace, the DSP 804 may display a Radio Group Advanced Dataset option, a Nielsen NationWide Dataset option, and a Nielsen MSA Dataset option. If the user selects the Nielsen MSA Dataset then the DSP 804 would take them to the Radio Group Spot Buying Workflow. Alternately, upon clicking the public MarketPlace the DSP 804 would show a Nielsen MSA Dataset option.

User Scenario 4: User selects a MarketPlace to see the Plan workbench. In one embodiment, a user is a Planner or Agency Self Service Buyer. One possible flow includes: a user goes to the DSP; the user logs in; the user picks a marketplace; the user sees the workbench with Plans that they have access to and those that belong to the picked marketplace. In one embodiment, a "workbench" has columns for each campaign including: Created Date; Start Date; End Date; Total Weeks; Planner; Name; Dataset used; Agency in seller assisted view (may not be present for agency buyers); Advertiser; Budget; Status (Booked/Saved/Cancellation); Shared by an agency (which indicates the plans Shared by Agency to the seller in the Seller Assisted View), where this Icon may become "Shared" in the Agency View; Locked, which indicates whether a plan falls within cancellation policy or not.

In one embodiment, Buyers may Filter the workbench to see plans based on one or more of the following: "Agency" to only show in seller assisted model; State; Plan Name; Active weeks; Trafficked (a boolean value); Shared; Locked (a boolean value), wherein a Locked plan is a plan where any changes to the plan may violate the cancellation policy per the TOS of the marketplace. In an edge case, if there are no existing plans in this marketplace/organization combination then the user is taken directly to the data providers page.

User Scenario 5: User is able to pick an appropriate data provider. In one embodiment, a user is a Planner or Agency Self Service Buyer. One possible flow includes: a user goes to the DSP; the user logs in; the user picks a marketplace; the user clicks on a new plan on the Plan List page; the user sees the data providers that the user's Organization have access to and applicable to the Marketplace. Examples of applicable datasets by marketplace include for a Radio Group Audiences dataset: a Radio Group advanced dataset or a Nielsen Audio NationWide dataset. Another example for a Spot Marketplace (for a Radio Group for example) is a Nielsen MSA Dataset. Again, Logo and Text on the datasets may be configurable to provide quick branding identification.

User Scenario 6: Picking Radio Group Data II Completing RFP Screen. In one embodiment, a user is a Planner or Agency Self Service Buyer. One possible flow includes: a user goes to the DSP; the user logs in; the user picks a marketplace; the user clicks on a new plan on the Plan List page; user picks the Radio Group. The User may then pick at least one of the following elements: Audience Category (e.g. Auto Intenders); Drop down of available Categories; Audience Survey (e.g. Spring 2015); Drop down of available books for that Category; Audience Segment: The value from the category (e.g. BMW, Nissan); Drop down of available values for this Category and Data Book (usually only a single cohort may be selected); Type input for Goal in Impressions; Type input for Budget limit; Pick Flight start and end date; Pick Locations; Pick Show Exclusions; Pick Agency (for seller assisted model)—Agency selection may not be available for Agency buyer; Pick Advertiser; and Pick Spot Length.

User Scenario 7: Picking Nielsen Data II User is able to complete RFP plan page. In one embodiment, a user is a Planner or Agency Self Service Buyer. One possible flow includes: a user goes to the DSP; the user logs in; the user picks a marketplace; the user clicks on a new plan on the Plan List page; the user picks Nielsen NationWide. The User may then pick at least one of the following elements: Data book (e.g. Spring 2015); Drop down of available books for that Category; Age; Gender; Type input for Goal in Impressions; Type input for Budget limit; Pick Flight start and end date; Pick Locations; Pick Show Exclusions; Pick Agency (for seller assisted model)—Agency selection may not be available for Agency buyer; Pick Advertiser; and Pick Spot Length (30 or 60).

User Scenario 8: Picking Spot MarketPlaces II User is able to fill RFP plan page. In one embodiment, a user is a Planner or Agency Self Service Buyer. One possible flow includes: a user goes to the DSP; the user logs in; the user picks a Spot marketplace; the user clicks on new plan on the Plan List page. The User may then pick at least one of the following elements: Diary Data book (e.g. Spring 2015)—Multiple data books may be selected, AQH used by the planner may be average of the Books used—wherein at least one diary book should be picked; PPM Data book (e.g. May 2015)—Multiple data books may be selected, AQH used by the planner may be average of the Books used—wherein at least one PPM book should be picked; Age; Gender; Content Exclusions of Format and Shows; Pick Agency (for seller assisted model)—Agency selection may not be available for Agency buyer; Pick Advertiser; Pick Spot Length.

User Scenario 9: User is able to pick advanced goals for a network marketplace. In one embodiment, a user is a Planner or Agency Self Service Buyer. One possible flow includes: a user goes to the DSP; the user logs in; the user picks a marketplace; the user clicks on a new plan on the Plan List page; the user picks a Radio Group or Agency Data or Nielsen. The user then is able to input one or more of the following for the first config: Pick Goal as Impressions or National GRPS; Multiple Start and End dates; Pick Daypart distribution where the dayparts are AM Drive, MidDay, PM Drive, OverNight; Multiple Markets may be typed in or selected from the location picker; Buyers may then select Reach goal, Pricing goal (CPM or CPP), and Budget limit—wherein only two of Reach, Pricing, and Budget are needed and the third is automatically calculated. Each config may be automatically numbered in an ascending fashion, and a User may also copy config. Each config is numbered and each row within a config is numbered. After the values are selected and submitted then user is taken back to the RFP screen (which may simply provide an option to edit advanced goals).

User Scenario 10: User is able to pick advanced goals for a spot marketplace. In one embodiment, a user is a Planner or Agency Self Service Buyer. One possible flow includes: a user goes to the DSP; the user logs in; the user picks a marketplace; the user clicks on a new plan on the Plan List page; the user picks Nielsen MSA data. The user may then input for a first config one or more of the following: Pick Goal as Impressions or Local GRPS; Multiple Start and End dates; Pick Daypart distribution where the dayparts are AM Drive, MidDay, PM Drive, OverNight; Single Market or Station may be selected—as the user is typing suggestions may be provided to the user; Buyers may then select Reach goal, Pricing goal (CPM or CPP), Budget limit—wherein only two of Reach, Pricing, Budget are needed and the third is automatically calculated. Each config is automatically numbered in an ascending fashion, and a User may also copy config. After the values are selected and submitted then user is taken back to the RFP screen (which may simply provide an option to edit advanced goals).

User Scenario 11: User saves a plan (Planning→save). In one embodiment, a user is a Planner or Agency Self Service Buyer. One possible flow includes: a user goes to the DSP; the user logs in; the user picks a marketplace; user completes planning; user clicks on save. The result is a plan state is changed to "Save" from "Planning". Upon clicking Save a possible message is shown: "Please note that the plan inventory will only be locked after you Book this plan. Saving a plan only saves plan input and goals. [Cancel] [Save]" (wherein [X] denotes a button with X displayed on the button).

User Scenario 12: User books a plan (save→book). In one embodiment, a user is a Planner or Agency Self Service Buyer. One possible flow includes: a user goes to the DSP; the user logs in; the user picks a marketplace; user completes planning and the plan is in Save state; user clicks on Book. The result is that in the event the Health of plan is less than 100% a an example message is shown (for 90% Health): "10% of your plan inventory is no longer available. You can book the remaining 90% as is, or replan. [Replan] [Book]" Alternately, if the Health of plan is 100% or if the user decides to book even if the health is less than 100%, the system proceeds to book by showing a message to agree with the TOS: "By booking the plan, you are agreeing to the Terms and Services. [Replan] [Book]". All booked plans may become visible to supply side planners.

An important edge case handled is when booking a saved plan that triggers unbooking of a second plan (that is within the violation policy) then a message is displayed, for example "The plan you are booking will automatically un-book another plan, causing a violation to the Terms and Services agreement on that plan. Please cancel that plan before booking this one. (Plan affected shown)." This scenario is as follows: Plan A is Booked; user replans Plan A to create a Plan B; if the user wants to book Plan B then Plan A should be canceled, and at this point it may trigger a TOS violation on Plan A.

User Scenario 13: User splits a plan by date range. In one embodiment, a user is a Planner or Agency Self Service Buyer. One possible flow includes: a user goes to the DSP; the user logs in; the user picks a marketplace; the user may split a plan into two using a date (before the date and after the date). For example, the date may only be end of a broadcast week, wherein splits may not be allowed in a middle of a broadcast week. One result may be that two plans are created split at the date picked.

User Scenario 14: User cancels a booked plan without violating cancellation policy. In one embodiment, a user is a Planner or Agency Self Service Buyer. One possible flow includes: a user goes to the DSP; the user logs in; the user picks a marketplace; user completes planning; user clicks on Cancel. One result is that a message is shown: "Are you sure you want to cancel your plan? [Do Not Cancel] [Cancel Plan]". One error case caught is if the plan is part of a campaign a message is displayed: "The plan you are trying to modify/delete is part of one or multiple campaigns. Please remove it from those campaigns first before modifying it."

User Scenario 15: User cancels a plan when the plan violates the cancellation policy. In one embodiment, a user is a Planner or Agency Self Service Buyer. One possible flow includes: a user goes to the DSP; the user logs in; the user picks a marketplace; user books a plan; user clicks on Cancel. One possible result when the plan violates the cancellation policy is showing a message to the user where the date is calculated as per the Terms and Service of each marketplace, Date {dd/mm/yyyy} is calculated using the cancellation policy per the marketplace and last week. For Example: If MarketPlace cancellation policy is 2 weeks, Date is calculated as the end of broadcast week starting now to 2 weeks out; if 2 weeks out is a Wed then that week Sun may be the calculated date. Cancellation policies may be different for different marketplaces. The shown message is: "Cancelling your plan now violates the Terms and Services agreement. If you wish to cancel, any inventory booked between now and {dd/mm/yyyy} cannot be changed without penalty. To cancel only inventory that is not locked, you can split the plan at {dd/mm/yyyy} to separate the locked inventory. You can then cancel the plan starting {dd/mm/yyyy}. You can also cancel your entire plan. According to our Terms and Services, you will be invoiced for booked inventory between now and {dd/mm/yyyy}. [Do Not Cancel][Cancel Plan]"

User Scenario 16: User replan a booked plan that doesn't violate Terms and Services. In one embodiment, a user is a Planner or Agency Self Service Buyer. One possible flow includes: a user goes to the DSP; the user logs in; the user picks a marketplace; user completes planning, user clicks on Replan. One possible result is to take the user to an RFP page and after they make changes and click submit, with a message showing replan options: "Replan options include: New Revision—This will alter the configuration of an RFP but the resulting plan(s) will not be anchored to the original plan; Anchored revision restricted to original placements—The new plan(s) will be anchored to the original plan and only allowed to use its placements. This is the more restrictive option that guarantees no additive changes to the lineup; Anchored revision restricted to original sites—The new plan(s) will be anchored to the original plan and only allowed to use its sites. This is a restrictive option that keeps the structure of the lineup intact but may choose to increase placements; Anchored revision and allow new sites—The new plan(s) will be anchored to the original plan and use its placement with preference. However, the resulting plan(s) may also use new sites if the goals cannot be met with the original sites only."

User Scenario 17: User replans a plan that violates Terms and Services.

In one embodiment, a user is a Planner or Agency Self Service Buyer. One possible flow includes: a user goes to the DSP; the user logs in; the user picks a marketplace; user completes planning, user clicks on Replan. One possible result when the re-planned plan violates a policy is showing a message to the user where the date is calculated as per the Terms and Service of each marketplace, Date {dd/mm/yyyy} is calculated using the cancellation policy per the marketplace and last week. For Example: If MarketPlace cancellation policy is 2 weeks, Date is calculated as the end of broadcast week starting now to 2 weeks out; if 2 weeks out is a Wed then that week Sun may be the calculated date. Cancellation policies may be different for different marketplaces. The shown message is: "Replanning your plan now violates the Terms and Services agreement. If you wish to replan, any inventory booked between now and {dd/mm/yyyy} cannot be changed without penalty. To change the other weeks, you can split the plan at {dd/mm/yyyy} to separate the locked inventory. You can then replan the plan starting dd/mm/yyyy."

User Scenario 18: User clones a plan. In one embodiment, a user is a Planner or Agency Self Service Buyer. One possible flow includes: a user goes to the DSP; the user logs in; the user picks a marketplace; the user may clone a saved or booked plan by selecting the "clone" action. One possible result is that the the user is taken to the RFP page with all details filled, and the user cannot change "Marketplace" or "Dataset".

User Scenario 20: User may launch a plan into a campaign. In one embodiment, a user is a Planner or Agency Self Service Buyer. One possible flow includes: a user goes to the DSP; the user logs in; the user picks a marketplace; the user may click on a plan and take the "Launch" action. One possible result is that the plan is launched into a campaign. All Booked plans may be visible to supply side planners. MSAs may be used instead of DMAs in a spot marketplace. In the event a plan in a campaign is cancelled, a message is shown "This plan is part of one or more campaigns. Please remove it from those campaigns before modifying or canceling [affected campaigns displayed]." Event rules are configured by a Marketplace and the availability of datasets for a user's organization. Event rules under campaigns may only be visible to users if the marketplace has event rules and if their organization has an event dataset associated with the marketplace.

User Scenario 21: User may export data. In one embodiment, a user is a Planner or Agency Self Service Buyer. One possible flow includes: a user goes to the DSP; the user logs in; the user picks a marketplace; the user may click on a plan and take the "Export" action. One possible result is that the user may download one or more of the following: Metrics as CSV; Export as Proposal XML; and Export Lineups.

User Scenario 22: An Agency User may share a plan with "MarketPlace" Sellers. In one embodiment, a user is a Planner or Agency Self Service Buyer. One possible flow includes: a user goes to the DSP; the user logs in; the user picks a marketplace; the user may click on a plan and take the "Share" action. One possible result is that the Agency Plan is Shared with the "MarketPlace" Sellers, and/or a message may be shown to Agency Buyers "Your Plan may be shared with [MarketPlace] sellers".

User Scenario 23: An Agency User may un-share a plan that has been previously shared with "MarketPlace" Sellers. In one embodiment, a user is a Planner or Agency Self Service Buyer. One possible flow includes: a user goes to the DSP; the user logs in; the user picks a marketplace; the user may click on a plan and set the "Share" action; then the user desires to un-share the plan by unsetting the "Share" action, e.g. by asserting an "Un-Share" action. One possible result is that the Agency Plan previously Shared with the "MarketPlace" Sellers is unShared. A message may be shown to the Agency Buyers "Your Plan may now be un-shared with [MarketPlace] sellers and [MarketPlace] sellers won't be able to view your plan".

User Scenario 24: User may see Specs on the results page. In one embodiment, a user is a Planner or Agency Self Service Buyer. One possible flow includes: a user goes to the DSP; the user logs in; the user picks a marketplace; the user may click on a plan and take the "Export" action. One possible result is that the user may view the specs, including a plan name, data set, data book, audience, buyer, seller, and notes. The panel may also include a table for the Top Markets summary, Dayparts summary, Formats summary, Weeks summary, and Markets summary.

User Scenario 25: User may edit Specs on Network Marketplaces. In one embodiment, a user is a Planner or Agency Self Service Buyer. One possible flow includes: a user goes to the DSP; the user logs in; the user picks a marketplace; the user selects the plan they want to edit; user clicks on an "Edit" icon. One possible result is that the user may edit: Buyer name; Seller name; and/or a generic text field like Notes.

User Scenario 26: User may edit Specs on Spot Marketplaces. In one embodiment, a user is a Planner or Agency Self Service Buyer. One possible flow includes: a user goes to the DSP; the user logs in; the user picks a marketplace; the user selects the plan they want to edit; user clicks on an "Edit" icon. One possible result is that the user may edit: Buyer name; Seller name; and/or a generic text field like Notes.

User Scenario 27: User may view goals. In one embodiment, a user is a Planner or Agency Self Service Buyer. One possible flow includes: a user goes to the DSP; the user logs in; the user picks a marketplace; the user goes to a plan results page. One possible result is that the user may view Goals as a set of summary tables, showing the Top Markets (e.g. Top 5 Markets with associated $ and %, Top 10 Markets with associated $ and %, and Top 50 Markets with associated $ and % and a pointer to show details), Markets (e.g. Top three MSAs with associated GRPs, $, and % and a pointer to show details), Dayparts (Top Dayparts with associated $ and % and a pointer to show details), Weeks (e.g. Top three weeks with associated $ and % and a pointer to show details), and Formats (Top Formats like Country, Cisc Rock, or Urban AC, with associated $ and % and a pointer to show details). The goals may be in the format of "Advanced Goals" that was input in, and for every input there may also be an output on what could be accomplished for the goal. The output may be color coded; if Output is within 10% of Input then the Output is color coded as Red, if Output greater or less than 10% of Input then the Output is color coded as Green.

In an alternate embodiment, goals show a Total Budget, a date range, a daypart distribution, and a result in Markets, showing for each row a set of Market/Stations and their associated Input and Result GRPs, Input and Result CPP, and Input/Result/Difference for the Budget.

User Scenario 28: User may view Insights. In one embodiment, a user is a Planner or Agency Self Service Buyer. One possible flow includes: a user goes to the DSP; the user logs in; the user picks a marketplace; the user is on a plan results page; the user clicks on an Insights tab. One possible result is that Insights are presented with various tables. On Network plans the tables may contain reach whereas in Spot Plans the tables may contain dollar amounts. Some specific examples of tables include: Top Markets; Ordered by Reach [GRPs/Impressions] if Network; Ordered by Dollars in the top markets bucket if Spot; Individual Markets; Dayparts; Weeks; and Formats.

User Scenario 29: User may view breakdowns. In one embodiment, a user is a Planner or Agency Self Service Buyer. One possible flow includes: a user goes to the DSP; the user logs in; the user picks a marketplace; the user is on a plan results page; the user clicks on a Breakdowns tab. One possible result is that First and Second dimension group by's are supported with the following: Format; Market (Market Rank is metadata for Market); Station (Market and Market Rank is metadata for Station dimension); Daypart; and Week. The same group-by may not be able to be picked on both first and second dimension but rest of the group-bys may be combined. Columns for a possible table include: Impressions—This metric is Summable and includes at least two columns, one for Impressions Number, and one for % of Impressions across the plan (% may add up to 100%); GRPs—GRPs are shown for Nielsen NationWide and Spot. But not necessarily for a Radio Group Audience, For Nielsen NationWide GRPs are summable for Nielsen NationWide, and GRPs have at least two columns for GRP count and % of the Plan (% may add up to 100%), For Spot GRPs are not necessarily summable for Spot so GRPs have at least one column of GRP count; Spots—Spots have at least two columns for Spot Count and % of Spot across the plan;

Price/CPM/CPP—made available for Spot on both Seller Assisted and Self Service, Network (Available on Supply Side and not necessarily Available on Self Service); In Self Service Mode for Spot Marketplaces (but not necessarily for Network)—Price (where Price is summable, and Price includes two columns for Price and %), CPM where the total CPM is the CPM for the entire buy and CPM has at least one column as the CPM value for that row; CPP—In Network, the total CPP is the CPP for the entire buy whereas in Spot, the total CPP may not be available, and CPP has at least one column as the CPP value for that row. The available Filters include: Format; Market; Station; Week; Daypart. The user may also download all data in the view as a CSV.

User Scenario 30: A limited set of users on the supply side may be provided with an ability to perform price overrides. In one embodiment, a user is a MarketPlace Planner. One possible flow includes: a user goes to the DSP; the user logs in; the user picks a marketplace; the user is on a plan results page; the user clicks on a Pricing tab. One possible result is that pricing data may be displayed as a table including Price, Impressions, CPM, GRPs, CPP, Spots, Adj (%), Pricing, Overplays; and Reported as column headers for each Config. This UI may be exactly the same as that for Pricing Overrides. Group By of the pricing table may be performed using configs instead of targets. This pricing edit feature may only be accessible to a select set of Marketplace/users as requested by the marketplace.

User Scenario 31: A limited set of users on the supply side may be provided with an ability to reserve a plan for the agency. In one embodiment, a user is a MarketPlace Planner. One possible flow includes: an agency user goes to the DSP; the user logs in; the user picks a marketplace; the user creates a plan; the user saves a plan; the user shares the plan with MarketPlace. One possible result is that a MarketPlace planner may see the plan shared by the agency, and/or the MarketPlace planner may reserve the plan for the agency.

User Scenario 32: Revoking an Agency Seat on a MarketPlace. In one embodiment, a user is a MarketPlace Seller. One possible flow includes: a MarketPlace informs programmatic ad network 206 that they would like to revoke an Agency Seat; programmatic ad network 206 then changes the Agency access to view only where this agency users may view current and old plans but cannot create new plans/campaigns.

User Scenario 33: Managing Audience dataset access for an Agency on a MarketPlace II Radio Group. In one embodiment, one possible flow includes: Audience dataset provider creates a dataset; the dataset is tagged with an Dataset External ID; MarketPlace//Radio Group sellers/planners may go to DSP 804 and collect the Agency "Internal" ID; Each Agency may be tagged with a ID in DSP 804; MarketPlace//Radio Group sellers/planners inform programmatic ad network 206 that Agency "Internal" ID may get access to Dataset External ID; programmatic ad network 206 then provides access to this Dataset to the identified Agency. In one embodiment, an edge case that is handled includes: if Agency doesn't have any Radio Group Audience Dataset then the Radio Group Advanced Dataset is not visible on Dataset selection page.

User Scenario 34: Managing Conditional (Event) dataset access for an Agency on a MarketPlace II Radio Group. In one embodiment, one possible flow includes: Weather event provider creates a dataset; the dataset is tagged with an Dataset External ID; MarketPlace//Radio Group sellers/planners may go to DSP 804 and collect the Agency "Internal" ID; each Agency may be tagged with a ID in DSP 804; MarketPlace//Radio Group sellers/planners inform programmatic ad network 206 that Agency "Internal" ID may get access to Dataset External ID; programmatic ad network 206 then provides access to this conditional Dataset to the identified Agency. One possible edge case that is handled includes: if an Agency does not have any Radio Group Conditional Datasets then: the Event Rules Tab under Campaigns is not visible; and the Event Rules Column is not visible under Rotations Tab of Campaign.

User Scenario 35: When a buyer on Radio Group Network using Radio Group Audience Dataset performs targeting by selecting an Audience Segment show a message warning the user that refinements could increase cost of plan. In one embodiment, a user is a Supply side planner or an Agency Buyer. One possible flow includes: a user goes to the DSP; the user logs in; the user picks a Radio Group marketplace; the user picks a Radio Group advanced dataset; the user creates a plan; the user picks an audience segment. One possible result includes: showing a message selection of an Audience Segment that states "Please note: as you add refinements, the cost of your plan may increase"; the message may stay on the Plan page as long as the user is on the plan page (if the user leaves the plan page and comes back, the message may not be brought back); The notification message may be dismissed by closing the notification message (once the notification message is dismissed the notification may not be shown again after further interaction during this current plan).

User Scenario 36: Save→Book new experience from Supply side. In one embodiment, a user is a supply side network planner. One possible flow includes: Supply side planner goes to the DSP; the user logs in; the user picks a Radio Group Marketplace; the user picks a Radio Group advanced dataset; the user creates a plan; the user saves the plan; the user now wants to book the plan. Possible changes include: the ability to Damage and Heal even Saved plans, not just Reserved/Booked plans; ability to show health in a Plan Details Summary; and based on the Health the Planner may decide to book, reserve or none of the above. In one embodiment, health is represented as a percentage from 0 to 100%.

User Scenario 37: Save→Book new experience for an Agency Buyer. In one embodiment, a user is an agency buyer. One possible flow includes: agency user goes to the DSP; the user logs in; the user picks a Radio Group Marketplace; the user picks a Radio Group advanced dataset; the user creates a plan; the user saves the plan; the user now wants to book the plan. Possible changes include: the ability to Damage and Heal even Saved plans, not just Reserved/Booked plans; if Health>98% booking may be allowed, with an edge case for the event when health drops lower than 98% when the user clicked the book button but the booking hasn't finished wherein a message is recited "Some inventory in your plan is no longer available. To repair plan damage, please replan"; if Health<98% don't allow for booking with the following message shown "Some inventory in your plan is no longer available. Please replan to heal damage before booking", and the user is allowed to replan.

User Scenario 38: Users may delete a Saved Plan. In one embodiment, a user is an network planner or agency buyer. One possible flow includes: agency user goes to the DSP; the user logs in; the user picks a Radio Group Marketplace; the user picks a Radio Group advanced dataset; the user creates a plan; the user saves the plan; the user now wants to delete the plan. One possible result is that the user may delete a saved plan, for example from an Action bar.

User Scenario 39: Changes to Cancel/Replan/Split for Agency Buyers. In one embodiment, a user is an agency buyer. One possible flow includes: agency user goes to the DSP; the user logs in; the user picks a Radio Group Marketplace; the user picks a Radio Group advanced dataset; the user creates a plan; the user saves/books the plan. One possible change includes: agency buyers may no longer cancel a booked plan (may remove the Cancel Action on Booked Plans); agency buyers may no longer split a saved/reserved/booked plan (may remove the Split Action on Saved/Reserved/Booked Plans); and agency buyers may no longer replan a booked plan (may remove the Replan Action on Booked Plans). In one embodiment, a supply side representative may effect these actions.

User Scenario 40: Homepage (Channel Page) Changes. In one embodiment, a user is an agency buyer or a self service buyer. One possible flow includes: upon an agency getting a seat on a Radio Group Marketplace, the agency gets an email with a link to a DSP; the agency user goes to the DSP; the user logs in. One possible result is that the user sees a Radio Group Audiences Marketplace and a tile called "Other MarketPlaces". One possible set of changes include: only a first Radio Group Audience is shown along with "Other MarketPlaces" tile; when the user clicks "Other MarketPlaces" then all other marketplaces are displayed.

User Scenario 401: Channel Page Changes. In one embodiment, a user is an agency buyer or a self service buyer. One possible flow includes: upon an agency getting a seat on a Radio Group Marketplace, the agency gets an email with a link to a DSP; the agency user goes to the DSP; the user logs in. One possible result is that the user sees this specific Marketplace and a tile called "Other MarketPlaces". One possible set of changes includes: only this specific MarketPlace is shown along with "Other MarketPlaces" tile; when the user clicks "Other MarketPlaces" then all other marketplaces are displayed; though the transition on clicking "Other MarketPlaces" may keep the user on the same page, the click may create a new link which may be bookmarked so that the user may directly go to the channel page with all marketplaces when desired. Vanity URLs may be offered for ease of retention.

User Scenario 41: Changes to Replan Message. In one embodiment, a user is an agency buyer or a network planner. In one embodiment, replan page messages include: "Would you like the new revision of your plan to be shaped like the original plan? You may restrict the new plan to only use the stations the original did. Also, you may restrict the new plan to only have as many plays in each week of each station as the original plan did"; "Same Stations, Limit Play Counts. The new plan might have fewer plays in some station-weeks, but it won't have more"; "Same Stations, Increase Play Counts, if Needed. In forming the plan, we first satisfy as much of the goal as we may without increasing play counts. If we need to, we then finish off the plan by adding plays where we need to"; "Increase Stations, Increase Play Counts, if Needed. As above, in forming the plan, we satisfy as much of the goal as we may without using additional stations or increasing play counts. If we need to, we then finish off the plan by adding stations and adding plays where we need to"; "Plan independently. This may shape the new plan independently of the shape the old plan had. The new plan may choose from all the stations allowed by your configuration and put as many plays in each week of each station as it needs to."

User Scenario 42: Changes to Replan Conflict Message when a network planner books/reserves a plan in a RFP that already has a Booked/Reserved plan. In one embodiment, a user is a network planner. In one embodiment, replan conflict page messages when trying to reserve and/or book include: "The following plan is a revision of the current plan and two revisions cannot be reserved/booked at the same time. It should be cancelled before you may reserve/book this plan."

User Scenario 43: Changes to Replan Conflict Message when an Agency buyer books/reserves a plan in a RFP that already has a Booked/Reserved plan. In one embodiment, a user is a network planner. In one embodiment, replan conflict page messages when trying to reserve and/or book include: "The following plan is a revision of the current plan and two revisions cannot be reserved/booked at the same time. It should be cancelled before you may reserve/book this plan"; "Please contact the Marketplace at 999-99-9999 to cancel the conflicting plan."

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An advertising exchange system, comprising:
a memory configured to store inventory data representing for each of a plurality of broadcast stations a corresponding inventory of audio advertising spots available from that broadcast station to be filled by the advertising exchange system; and
a processor coupled to the memory, and coupled via a network connection to a real-time media-delivery appliance,
wherein the real-time media-delivery appliance corresponds to a broadcast station, wherein the broadcast station is a terrestrial radio broadcast station, and
wherein the real-time media-delivery appliance comprises a capability to directly play content after detecting and decoding an in-band trigger from output of a terrestrial radio broadcast mixer in the broadcast station, and
wherein the processor is configured to:
receive via a demand side interface one or more sets of advertising campaign data, each representing a set of advertising objectives of an advertising campaign;
receive via a supply side interface the inventory data for the memory;
use the inventory data to determine for each advertising campaign a corresponding set of advertising spots to be associated with that advertising campaign;
receive via the network connection from the real-time media-delivery appliance a real-time media-delivery appliance report of a playtime for an advertising spot within the corresponding set of advertising spots,
wherein the real-time media-delivery appliance report is based at least in part on a real-time media-delivery appliance directly monitoring output in-band of the terrestrial radio broadcast mixer in the broadcast station; and
determine real-time campaign performance, based at least in part on the real-time media-delivery appliance report, for a reported advertising campaign associated with the corresponding set of advertising spots for the broadcast station.

2. The system recited in claim 1, wherein the determination is made "last minute" within two weeks before a play date for the corresponding set of advertising spots.

3. The system recited in claim 2, wherein the demand side interface is coupled to a plurality of broadcast advertisers.

4. The system recited in claim 3, wherein the supply side interface is coupled to a plurality of broadcast stations.

5. The system recited in claim 4, wherein the determination is made by programmatically optimizing across two or more of said advertising campaigns.

6. The system recited in claim 5, further comprising an exchange interface to a second advertising exchange system, wherein the determination is made by programmatically optimizing across two or more advertising exchange systems.

7. The system recited in claim 6, wherein the determination is programmatically based at least in part on a respective fitness metric computed for each advertising campaign.

8. The system recited in claim 7, wherein the determination is programmatically based at least in part on a respective fitness metric computed for each advertising campaign, wherein the computed fitness is demo-match.

9. The system recited in claim 8, wherein the determination is programmatically based at least in part on a respective fitness metric computed for each advertising campaign, wherein the computed fitness is demo-match plus an additional metric.

10. The system recited in claim 9, wherein the determination is dynamic by making a rolling adjustment to integrate an added advertising campaign.

11. The system recited in claim 10, wherein the determination is dynamic by making a rolling adjustment to integrate advertising campaigns added throughout a week.

12. The system recited in claim 11, wherein the supply side interface is coupled to a single private set of broadcast stations representing a private inventory data pool.

13. The system recited in claim 12, wherein the supply side interface is coupled to a plurality of sets of broadcast stations representing a public inventory data pool.

14. The system recited in claim 13, wherein the supply side interface is coupled to a single private set of broadcast stations representing a private inventory pool.

15. The system recited in claim 14, wherein the processor is further coupled to a plurality of real-time media-delivery appliances in each of the plurality of broadcast stations, wherein the plurality of terrestrial in band play out real-time media-delivery appliances are coupled to the memory and the processor by a network connection, wherein a real-time media-delivery appliance auto-generates instructions to implement an advertising campaign.

16. The system recited in claim 15, further comprising a dashboard, wherein the dashboard is coupled to the memory and the processor by a network connection, wherein the dashboard provides access to a real-time recording of at least a portion of a campaign and reporting.

17. The system recited in claim 16, wherein the supply side interface also has an ability for a broadcast station to review upcoming advertising campaigns to perform at least one of: separation, blacklisting, and charging differential pricing.

18. The system recited in claim 17, wherein the determination is based at least in part on an overall optimization of an advertiser side and a broadcast station side.

19. The system recited in claim 18, wherein the overall optimization includes choosing an alternate plan for each advertising campaign an alternate corresponding set of advertising spots to be associated with that advertising campaign in the event that a better return benefits one or more broadcast stations given a same utility to an advertiser.

20. The system as recited in claim 19, wherein the memory is further configured to store inventory data representing for each of a plurality of streaming stations a corresponding inventory of audio advertising spots available from that streaming station to be filled by the advertising exchange system.

21. A method, comprising:
storing inventory data representing for each of a plurality of broadcast stations a corresponding inventory of audio advertising spots available from that broadcast station to be filled by an advertising exchange system; and
receiving via a demand side interface one or more sets of advertising campaign data, each representing a set of advertising objectives of an advertising campaign;
receiving via a supply side interface the inventory data;
using the inventory data to determine for each advertising campaign a corresponding set of advertising spots to be associated with that advertising campaign;
receiving via a network connection from a real-time media-delivery appliance a real-time media-delivery appliance report of a playtime for an advertising spot within the corresponding set of advertising spots,
wherein the real-time media-delivery appliance report is based at least in part on the real-time media-delivery appliance directly monitoring output in-band of a terrestrial radio broadcast mixer in a broadcast station,
wherein the broadcast station is a terrestrial radio broadcast station,
wherein the real-time media-delivery appliance comprises a capability to directly play content after detecting and decoding an in-band trigger from output of a terrestrial radio broadcast mixer in the broadcast station; and
determining real-time campaign performance, based at least in part on the real-time media-delivery appliance report, for a reported advertising campaign associated with the corresponding set of advertising spots for the broadcast station.

22. A computer program product, the computer program product being embodied in a non-transitory computer readable storage medium and comprising computer instructions for:
storing inventory data representing for each of a plurality of broadcast stations a corresponding inventory of audio advertising spots available from that broadcast station to be filled by an advertising exchange system; and
receiving via a demand side interface one or more sets of advertising campaign data, each representing a set of advertising objectives of an advertising campaign;
receiving via a supply side interface the inventory data;
using the inventory data to determine for each advertising campaign a corresponding set of advertising spots to be associated with that advertising campaign;
receiving via a network connection from a real-time media-delivery appliance a real-time media-delivery appliance report of a playtime for an advertising spot within the corresponding set of advertising spots,
wherein the real-time media-delivery appliance report is based at least in part on the real-time media-delivery appliance directly monitoring output in-band of a terrestrial radio broadcast mixer in a broadcast station,
wherein the broadcast station is a terrestrial radio broadcast station, and
wherein the real-time media-delivery appliance comprises a capability to directly play content after detecting and decoding an in-band trigger from output of a terrestrial radio broadcast mixer in the broadcast station; and
determining real-time campaign performance, time based at least in part on the real-time media-delivery appliance report, for a reported advertising campaign associated with the corresponding set of advertising spots for the broadcast station.

* * * * *

UNITED STATES PATENT AND TRADEMARK OFFICE
CERTIFICATE OF CORRECTION

PATENT NO. : 10,796,333 B1
APPLICATION NO. : 15/130841
DATED : October 6, 2020
INVENTOR(S) : Jateen P. Parekh et al.

It is certified that error appears in the above-identified patent and that said Letters Patent is hereby corrected as shown below:

In the Drawings
In sheet(s) 12 of 12, figure 9, block 908, after "using data to", delete "to".

In the Specification
In Column 31, Line(s) 45, after "Data", delete "II" and insert --//--, therefor.
In Column 31, Line(s) 63, after "Data", delete "II" and insert --//--, therefor.
In Column 32, Line(s) 10, after "MarketPlaces", delete "II" and insert --//--, therefor.
In Column 37, Line(s) 46, after "MarketPlace", delete "II" and insert --//--, therefor.
In Column 37, Line(s) 61, after "MarketPlace", delete "II" and insert --//--, therefor.

In the Claims
In Column 41, Line(s) 41, Claim 15, delete "terrestrial in band play out".
In Column 42, Line(s) 26, Claim 21, after "station,", insert --and--.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*